United States Patent
Das Sharma

(10) Patent No.: US 12,056,029 B2
(45) Date of Patent: Aug. 6, 2024

(54) IN-SYSTEM VALIDATION OF INTERCONNECTS BY ERROR INJECTION AND MEASUREMENT

(71) Applicant: Intel Corporation, Santa Clara, CA (US)

(72) Inventor: Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 585 days.

(21) Appl. No.: 17/115,168

(22) Filed: Dec. 8, 2020

(65) Prior Publication Data

US 2021/0089418 A1    Mar. 25, 2021

Related U.S. Application Data

(60) Provisional application No. 63/057,168, filed on Jul. 27, 2020.

(51) Int. Cl.
  *G06F 11/263*  (2006.01)
  *G06F 11/10*   (2006.01)
  (Continued)

(52) U.S. Cl.
  CPC ........ *G06F 11/263* (2013.01); *G06F 11/1004* (2013.01); *G06F 11/221* (2013.01);
  (Continued)

(58) Field of Classification Search
  CPC .. G06F 11/263; G06F 11/1004; G06F 11/221; G06F 11/2215; G06F 11/2247;
  (Continued)

(56) References Cited

U.S. PATENT DOCUMENTS 7,010,607 B1 *  3/2006  Bunton ............... H04L 1/18
                                          709/228
9,384,108 B2 *  7/2016  McIlvain ............ G06F 11/27
(Continued)

FOREIGN PATENT DOCUMENTS

EP       3087710 A1    11/2016

OTHER PUBLICATIONS

EPO; Extended European Search Report issued in EP Patent Application No. 20209957.8, dated May 10, 2021; 7 pages.
(Continued)

*Primary Examiner* — Bryce P Bonzo
*Assistant Examiner* — Michael Xu
(74) *Attorney, Agent, or Firm* — Alliance IP, LLC

(57) ABSTRACT

Systems and devices can include an error injection register comprising error injection parameter information. The systems and devices can also include error injection logic circuit to read error injection parameter information from the error injection register, and inject an error into a flow control unit (Flit); and protocol stack circuitry to transmit the Flit comprising the error on a multilane link. The injected error can be detected by a receiver and used to test and characterize various aspects of a link, such as bit error rate, error correcting code, cyclic redundancy check, replay capabilities, error logging, and other characteristics of the link.

24 Claims, 16 Drawing Sheets

(51) Int. Cl.
*G06F 11/22* (2006.01)
*G06F 11/30* (2006.01)
*G06F 13/40* (2006.01)

(52) U.S. Cl.
CPC ...... *G06F 11/2215* (2013.01); *G06F 11/2247* (2013.01); *G06F 11/3027* (2013.01); *G06F 13/4027* (2013.01)

(58) Field of Classification Search
CPC ............. G06F 11/3027; G06F 13/4027; G06F 13/4295; G06F 2213/0026; G06F 13/1684; G06F 13/4068; G06F 13/4282; G06F 2213/0042; H04L 1/242; H04L 1/0041; H04L 1/0045; H04L 1/0061; H04L 1/24
See application file for complete search history.

(56) References Cited

U.S. PATENT DOCUMENTS

| | | | |
|---|---|---|---|
| 9,432,298 B1* | 8/2016 | Smith | H04L 49/9057 |
| 9,648,148 B2 | 5/2017 | Rimmer et al. | |
| 9,887,804 B2 | 2/2018 | Birrittella | |
| 10,230,625 B2 | 3/2019 | Maeda et al. | |
| 10,261,880 B1* | 4/2019 | Levin | G06F 11/2221 |
| 10,409,744 B1 | 9/2019 | Gross et al. | |
| 10,528,421 B2 | 1/2020 | Tang et al. | |
| 2002/0172164 A1 | 11/2002 | Chou et al. | |
| 2006/0179394 A1 | 8/2006 | O'Neill et al. | |
| 2007/0101238 A1 | 5/2007 | Resnick et al. | |
| 2010/0162066 A1 | 6/2010 | Papirla et al. | |
| 2014/0112339 A1 | 4/2014 | Safranek et al. | |
| 2015/0131456 A1 | 5/2015 | Allmendinger et al. | |
| 2015/0281126 A1 | 10/2015 | Regula et al. | |
| 2016/0085619 A1 | 3/2016 | Iyer et al. | |
| 2016/0147592 A1 | 5/2016 | Guddeti | |
| 2016/0179610 A1 | 6/2016 | Morris et al. | |
| 2016/0179710 A1 | 6/2016 | Sharma et al. | |
| 2016/0299860 A1 | 10/2016 | Harriman | |
| 2017/0019247 A1* | 1/2017 | Iyer | H04L 1/243 |
| 2018/0096736 A1* | 4/2018 | Teoh | G06F 9/4403 |
| 2018/0181502 A1 | 6/2018 | Jen et al. | |
| 2018/0196103 A1* | 7/2018 | Champoux | G01R 31/31908 |
| 2018/0203963 A1* | 7/2018 | Eghbal | G06F 11/261 |
| 2019/0042380 A1* | 2/2019 | Das Sharma | G06F 13/4295 |
| 2019/0149265 A1 | 5/2019 | Sharma | |
| 2019/0176838 A1* | 6/2019 | Kakoee | G06F 11/2215 |
| 2019/0305888 A1 | 10/2019 | Sharma | |
| 2020/0012555 A1 | 1/2020 | Sharma | |
| 2020/0118642 A1* | 4/2020 | Fuoco | G06F 11/1004 |
| 2020/0145341 A1 | 5/2020 | Sharma | |
| 2020/0364129 A1 | 11/2020 | Sharma | |
| 2020/0366573 A1* | 11/2020 | White | G06F 9/45558 |
| 2020/0366587 A1* | 11/2020 | White | G06F 11/0709 |
| 2021/0050941 A1* | 2/2021 | Das Sharma | G06F 11/1004 |
| 2021/0133019 A1 | 5/2021 | Dykstra et al. | |

OTHER PUBLICATIONS

EPO Communication Pursuant to Article 94(3) in EP Application Serial No. EP20209707.7-1206 mailed on May 11, 2023 (6 pages).
USPTO; U.S. Non-Final Office Action for U.S. Appl. No. 16/947,558 received on May 5, 2023; 15 pages.
USPTO; U.S. Appl. No. 16/947,558, filed Aug. 6, 2020; 59 pages.
USPTO; U.S. Appl. No. 17/031,822, filed Sep. 24, 2020; 55 pages.
USPTO; U.S. Appl. No. 17/086,085, filed Oct. 30, 2020; 55 pages.
EPO; Extended European Search Report issued in EP Patent Application No. 20210637.3, dated May 28, 2021; 8 pages.
EPO; Extended European Search Report issued in EP Patent Application No. 20216645.0, dated Jun. 8, 2021; 7 pages.
EPO; Extended European Search Report issued in EP Patent Application No. 20209707.7, dated May 3, 2021; 13 pages.
Jackson, Mike, et al.; "PCI Express Technology Comprehensive Guide to Generations 1.x, 2.x, and 3.0," Mindshare Press; Sep. 1, 2012; 181 pages.
PCI Express Base Specification Revision 5.0, v. 1.0; pp. 97-98, 105-107, 198, 202, 233, 250; Peripheral Component Interconnect Special Interest Group; Beaverton, OR; May 22, 2019; 9 pages.
USPTO; U.S. Non-Final Office Action for U.S. Appl. No. 17/031,822 received on Jun. 14, 2023; 8 pages.
USPTO; U.S. Final Office Action for U.S. Appl. No. 17/031,822 received on Sep. 19, 2023; 9 pages.
USPTO; U.S. Non-Final Office Action for U.S. Appl. No. 17/086,085 received on Aug. 31, 2023; 8 pages.

* cited by examiner

IN-SYSTEM VALIDATION OF INTERCONNECTS BY ERROR INJECTION AND MEASUREMENT

CROSS REFERENCE TO RELATED APPLICATION

Pursuant to 35 U.S.C. § 119(e), this application claims the benefit of U.S. Provisional Patent Application Ser. No. 63/057,168, titled, "IN-SYSTEM VALIDATION VIA ERROR INJECTION AND MEASUREMENT OF INTERCONNECTS," filed on Jul. 27, 2020, the entire contents of which are incorporated by reference herein.

BACKGROUND

As data rates in serial interconnects increase for each PCIe generation, bit error rates (BER) of $10^{-12}$ are expected across every lane of the link. As the number of lanes of the link increases, BER can be impacted by cross-talk, inter-symbol interference (ISI), and channel loss arising from the socket, the vias, the board, the connector, and the add-in card (AIC), etc. With the deployment of PAM-4 encoding for the next generation data rates (e.g., PCIe Gen 6 at 64 GT/s along with the next generation of CXL and UPI data rates) the target BER is higher at $10^{-6}$.

Figure 1:
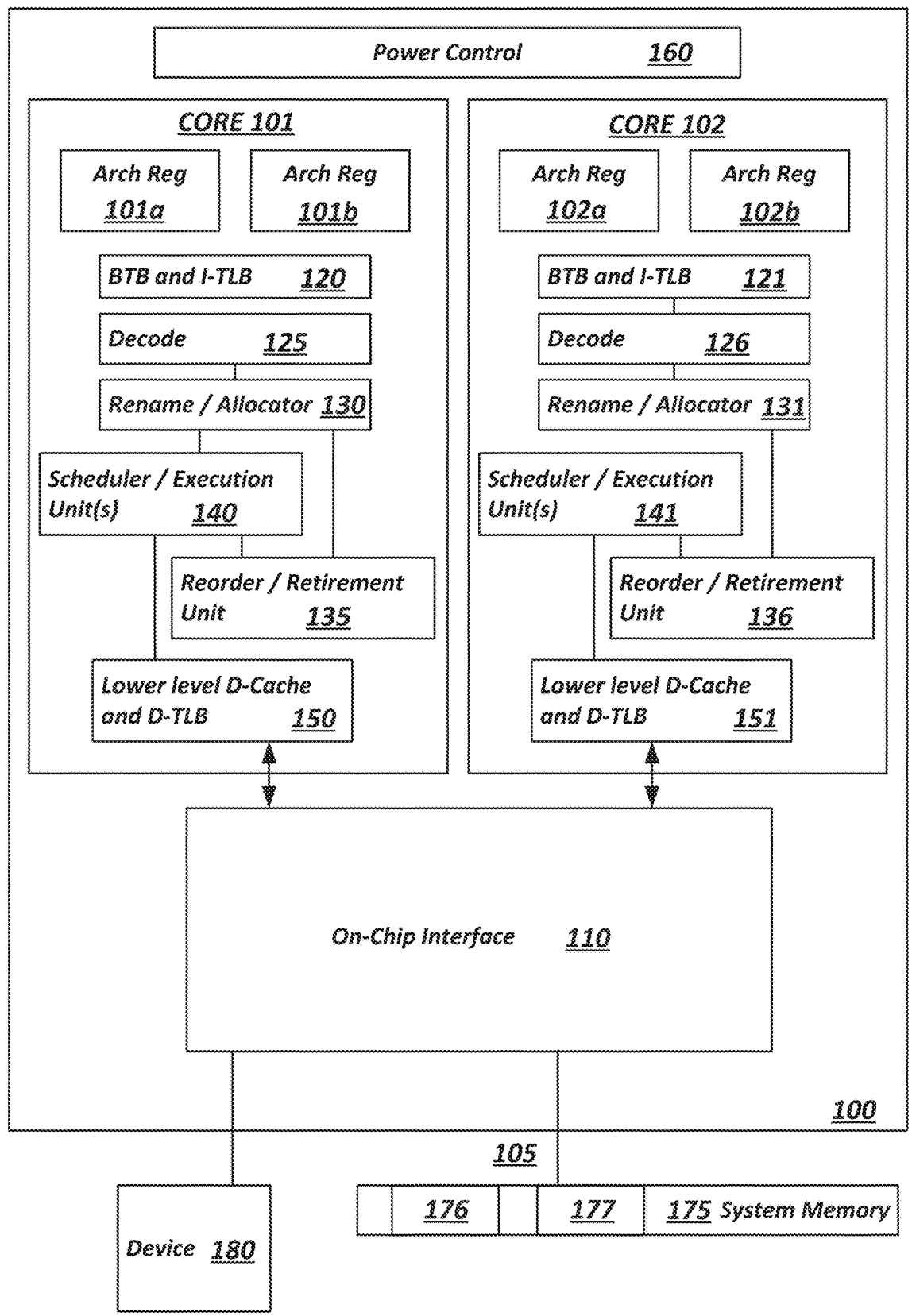
FIG. 1 illustrates an embodiment of a block diagram for a computing system including a multicore processor.

Figures are not drawn to scale.

DETAILED DESCRIPTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it is a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

As data rates increase in the interconnects such as PCIe/CXL/UPI, validating the link performance and RAS capabilities at system level is becoming a significant challenge. The lack of architected mechanisms creates further complexities as systems consist of components from multiple vendors. This affects both functional correctness as well as expected link level performance which will see significant challenges as we move to higher data rates with PAM-4 encoding and the resulting recovery mechanisms (such as Forward Error Correction (FEC) and Link Level Retry (LLR)) to handle the high BER resulting from PAM-4.

This disclosure describes error injection and latency measurement mechanisms to validate the components of the interconnect, including the link and retimers, and help characterize the links in an architected, automated, and standardized manner across all implementations using the same Link protocol.

Figure 2A:
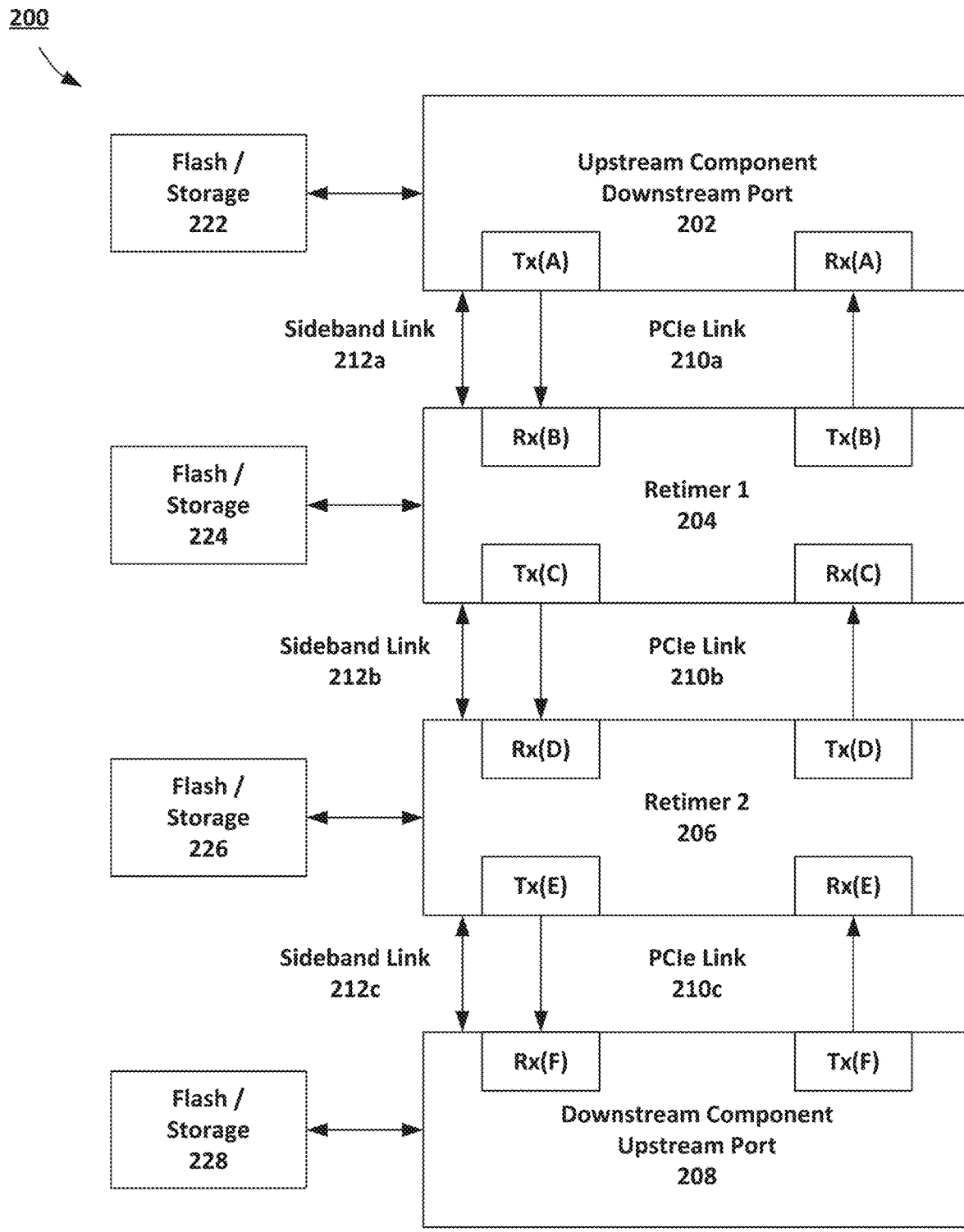
FIGS. 2A-2B are simplified block diagrams of example links that include one or more retimers in accordance with embodiments of the present disclosure.
Figure 2B:
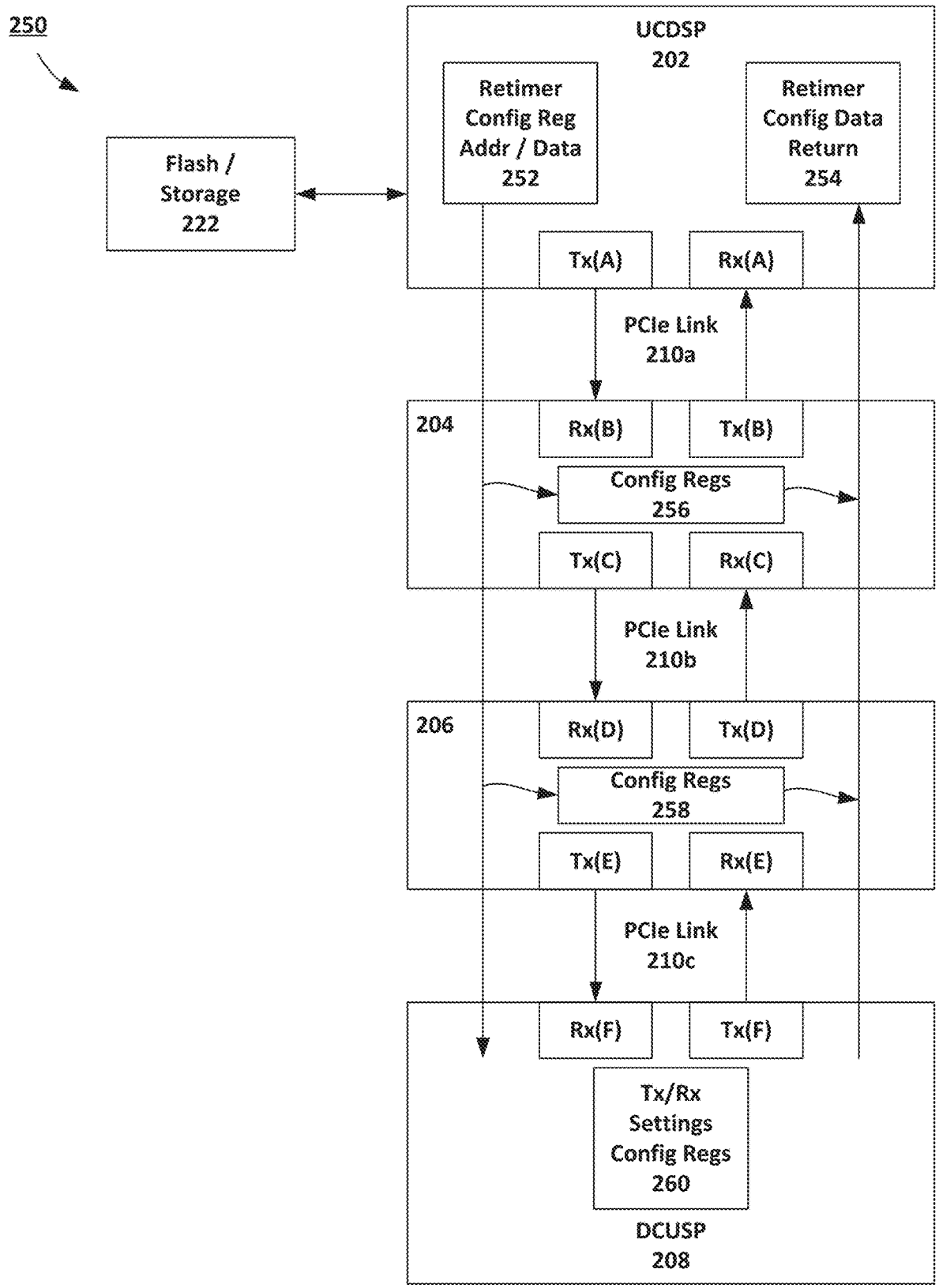

FIGS. 2A-B show a sample multi-Lane Link with or without Retimer(s). If one or more retimer(s) is present, then each link segment is electrically independent and can accumulate errors in each Receiver independently. Thus, with one Retimer, an error may be introduced in the Receiver of the Retimer or the Receiver of the Port. Retimers operate on a per-Lane basis and hence do not correct or detect any errors in the Flit which operates across all Lanes in the Link. If one or more retimer(s) is present, then each link segment is electrically independent and can accumulate errors in each receiver independently. Thus, with one retimer, an error may be introduced in the receiver of the retimer or the receiver of the port. Retimers operate on a per-lane basis and hence do not correct or detect any errors in the Flit which operates across all lanes in the link. Though shown to include retimers, it is understood that the use of retimers is implementation-specific.

FIG. 2A is a schematic diagram illustrating a sample topology 200 with two re-timers 204 and 206 between an upstream component downstream port 202 and a downstream component upstream port 208 in accordance with embodiments of the present disclosure. The upstream component downstream port 202 can be a port for a PCIe-based device, such as a CPU or other device capable of generating a data packet and transmitting the data packet across a data Link compliant with the PCIe protocol. The downstream component upstream port 208 can be a port for a peripheral component that can receive a data packet from a Link compliant with the PCIe protocol. It is understood that the upstream component downstream port 202 and the downstream component upstream port 208 can transmit and receive data packets across PCIe Link(s), illustrated as PCIe Link 210a-c.

The topology 200 can include one or more retimers 204 and 206. Retimers 204 and 206 can serve as a signal repeater operating at the physical layer to fine tune the signal from the upstream component 202 and/or the downstream component upstream port 208. A retimer can use Continuous Time Linear Equalization (CTLE), Decision Feedback Equalization (DFE), and transmit an impulse response equalization (Tx FIR EQ, or just TxEQ). Re-timers are transparent to the data Link and transaction layers but implement the full physical layer.

The multi-Lane PCIe Link is split into three Link segments (LS) 210a, 210b, and 210c in each direction. The upstream component downstream port 202 can be coupled to retimer 1 204 by a multi-Lane PCIe Link 210a. The retimer 1 204 can be coupled to retimer 2 206 by link segment 210b. And retimer 2 206 can be coupled to downstream component upstream port 208 by link segment 210c.

Components can also be coupled by sideband linkages. The upstream component downstream port 202 can be coupled to retimer 1 204 by a sideband link 212a. The retimer 1 204 can be coupled to retimer 2 206 by sideband link 212b. And retimer 2 206 can be coupled to downstream component upstream port 208 by sideband link 212c.

A primary function of a retimer (buffer) device is signal re-timing. These functions are performed by retimers 204 and 206. The particular retimer device circuits will depend on the PHY being used for the link. Generally, retimer circuitry is configured to recover the incoming signal and retransmit using a local clock and new transmit equalization circuitry, and may typically employ well-known circuitry for this purpose, such as phase lock loops. A retimer may further comprise transmitter and receiver circuitry including one or more amplifier circuits, as well as various types of well-known signal-conditioning circuitry used to increase the drive level of a received signal. Such retimer circuitry is well-known to those skilled in the high-speed interconnect arts, and, accordingly, no further details are shown or discussed herein.

Each retimer 204 and 206 can have an upstream path and a downstream path. In some implementations, a retimer can include two pseudo ports, and the pseudo ports can determine their respective downstream/upstream orientation dynamically. Further, retimers 204 and 206 can support operating modes including a forwarding mode and an executing mode. Retimers 204 and 206 in some instances can decode data received on the sub-link and re-encode the data that it is to forward downstream on its other sublink. As such, retimers may capture the received bit stream prior to regenerating and re-transmitting the bit stream to another device or even another retimer (or redriver or repeater). In some cases, the retimer can modify some values in the data it receives, such as when processing and forwarding ordered set data. Additionally, a retimer can potentially support any width option as its maximum width, such as a set of width options defined by a specification such as PCIe.

As data rates of serial interconnects (e.g., PCIe, UPI, USB, etc.) increase, retimers are increasingly used to extend the channel reach. Multiple retimers can be cascaded for even longer channel reach. It is expected that as signal speeds increase, channel reach will typically decrease as a general matter. Accordingly, as interconnect technologies accelerate, the use of retimers may become more common. As an example, as PCIe Gen-4, with its 16 GT/s, is adopted in favor of PCIe Gen-3 (8 GT/s), the use of retimers in PCIe interconnects may increase, as may be the case in other interconnects as speeds increase.

In one implementation, a common BGA (Ball Grid Array) footprint may be defined for PCI Express Gen-4 (16 GT/s) based retimers. Such a design may address at least some of the example shortcomings found in conventional PCIe Gen-3 (8 GT/s) retimer devices, as well as some of the issues emerging with the adoption of PCIe Gen-4. Further, for PCIe Gen-4, the number of retimer vendors and volume are expected to increase. Due to signal losses from the doubled data rate (from 8 GT/s to 16 GT/s), the interconnect length achievable is significantly decreased in Gen-4. In this and other example interconnect technologies, as data rate increases, retimers may thereby have increased utility as they can be used to dramatically increase channel lengths that would be otherwise constrained by the increased data rate, such as in PCIe Gen 5 and Gen 6 and beyond.

Although shown to be separate from the upstream component and downstream component, the retimer can be part of the upstream or downstream components, on board with the upstream or downstream components, or on package with the downstream component.

The upstream component downstream port 202 can have access to a storage element 222, such as a flash storage, cache, or other memory device. The retimer 1 204 can optionally include a similar storage element 224. The retimer 2 206 can optionally include a similar storage element 226. The downstream component upstream port 208 can optionally include a similar storage element 228.

FIG. 2B is a schematic diagram of a connected system 250 that illustrates in-band upstream port and retimer configuration in accordance with embodiments of the present disclosure. As shown in FIG. 2A, an upstream component downstream port 202 can be coupled to the downstream component upstream port 208 by a link 210a-c that is extended by two retimers 204, 206. In this example, the downstream port 202 can be provided with a retimer configuration register address/data register 252 to hold data to be sent in a configuration access command to one of the two retimers using fields of an enhanced SKP OS. One or more bits of the SKP OS can include a command code, data, or an address for use at a configuration register (e.g., 256, 258) of a retimer (e.g., 204, 206, respectively) to read or write data from/to the register 256, 258. Retimers can respond to configuration access commands sent by encoding data in an instance of an enhanced SKP OS by itself encoding response data in a subsequent instance of an enhanced SKP OS. Data encoded by the retimer (e.g., 204, 206) may be extracted at the downstream port and recorded in a retimer configuration data return register (e.g., 254). The registers (e.g., 252, 254) maintained at the upstream device downstream port 202 can be written to and read from by system software and/or other components of the system allowing (indirect) access to the retimer registers: one register (e.g., 252) conveying the address/data/command to the retimer and a second register (e.g., 254) that stores the responses coming back from the re-timer. In other implementations, such registers (e.g., 260) can be maintained at the downstream component upstream port 208 instead of or in addition to the registers being maintained at the upstream component downstream port 202, among other examples.

Continuing with the example of FIG. 2B, in connection with a mechanism for providing in-band access to retimer registers, the retimer may have architected registers that are addressable with well-defined bits and characteristics. In this example, an enhanced SKP OS is defined/modified as the physical layer-generated periodic pattern to carry the commands/information from "Retimer Config Reg Addr/Data" (e.g., 252) to the re-timers and carrying the responses from the re-timers back to load to "Retimer Config Data Return" (e.g., 840), with some bits allotted for CRC for the protection of data. For example, in PCIe this can include enhancing the existing SKP Ordered Set (e.g., with CSR Access and CSR Return (CRC-protected bits)). Further, a flow for ensuring guaranteed delivery of the commands/information to retimer and the corresponding response back can be defined. The physical layer mechanism can be enhanced to also include notifications from the re-timer (in addition to response) if it needs some sort of service, among other examples features.

If one or more retimer(s) is present, then each link segment is electrically independent and can accumulate errors in each Receiver independently. Thus, with one Retimer, an error may be introduced in the Receiver of the Retimer or the Receiver of the Port. Retimers operate on a per-Lane basis and hence do not correct or detect any errors in the Flit which operates across all Lanes in the Link.

PCIe Gen 6 (PCI Express $6^{th}$ Generation) at 64.0 GT/s, CXL 3.0 (Compute Express Link $3^{rd}$ Generation) at 64.0 GT/s, and CPU-CPU symmetric coherency links such as UPI (Ultra Path Interconnect) at frequencies above 32.0 GT/s (e.g., 48.0 GT/s or 56.0 GT/s or 64.0 GT/s) are examples of interconnects that will need FEC to work in conjunction with CRC. In SoCs, it is highly desirable for the same PHY to be multi-protocol capable and used as PCIe/CXL/UPI depending on the device connected as the Link partner.

In embodiments of this disclosure, multiple protocols (e.g., PCIe, CXL, UPI) may share a common PHY. Each protocol, however, may have different latency tolerance and bandwidth demands. For example, PCIe may be more tolerant to a latency increase than CXL. CPU-CPU symmetric cache coherent links such as UPI are most sensitive to latency increases.

Links such as PCIe and CXL can be partitioned into smaller independent sub-links. For example, a x16 PCIe/CXL link may be partitioned to up to 8 independent links of x2 each. A symmetric cache coherent link may not support that level of partitioning. Due to the differences in latency characteristics, partitioning support, as well as due to fundamental protocol differences, these links may use different flow control unit (Flit) sizes and Flit arrangements, even though they may share the same physical layer.

Figure 3:
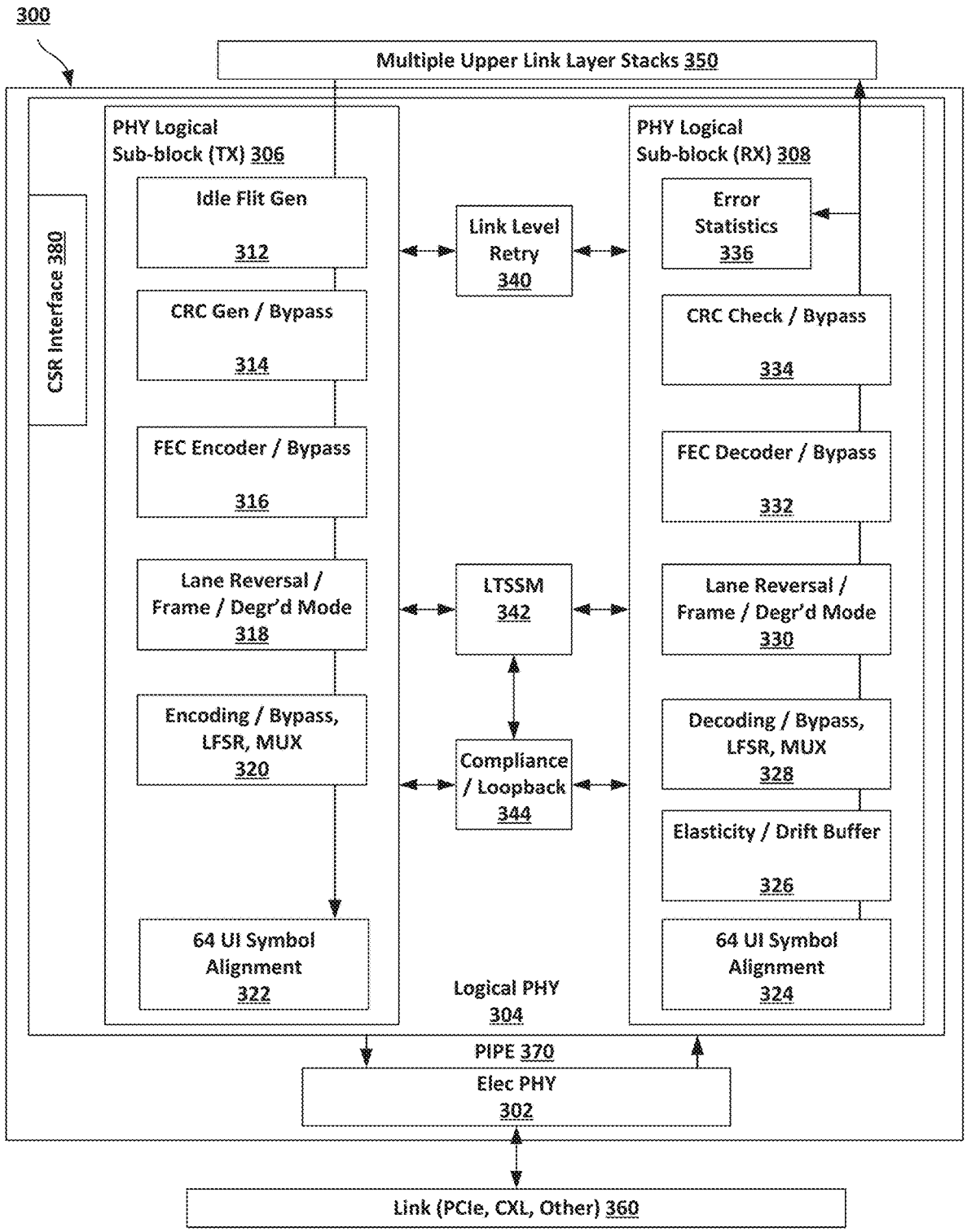
FIG. 3 is a schematic diagram of a common physical layer (common PHY) to support multiple interconnect protocols in accordance with embodiments of the present disclosure.

FIG. 3 is a schematic diagram of a common physical layer (common PHY) 300 to support multiple interconnect protocols in accordance with embodiments of the present disclosure. A PHY is an abbreviation for "physical layer," and is an electronic circuit that can implement physical layer functions of the OSI model.

FIG. 3 illustrates an example common PHY 300 (both analog PHY as well as Logical PHY) with PAM-4 encoding at higher data rates that can support multiple protocols (e.g., PCIe, CXL, UPI, Cache Coherent Interconnect for Accelerators (CCIX), Open Coherent Accelerator Processor Interface (CAPI), etc.) operating at different data rates. Both the analog PHY 302 and the Logical PHY 304 are common to each protocol supported. The analog PHY 302 can support a multi-lane link, such as an x16 PCIe link, with 48 GT/s and 56 GT/s PAM-4 for other interconnect protocols.

The logical PHY 304 can include a TX logical sub-block 306 and an RX logical sub-block 308. The TX logical sub-block 306 can include logic to prepare the data stream for transmission across the link. For example, the TX logical sub-block 306 can include an Idle Flit Generator 312 to generate Flits. Flit sizes can be determined based on the protocol, bandwidth, operation conditions, protocol being used, etc. A cyclic redundancy check (CRC) code generator 314 can include one or more CRC code generators and rolling CRC code generators for generating CRC codes. CRC codes are error-detecting codes to detect accidental changes to the data. In embodiments, the CRC code generator 314 can be bypassed while maintaining clock integrity. The TX logical sub-block 306 can also include a forward error correction (FEC) encoder 316, to encode the data with error correcting code (ECC). The FEC encoder 316 can also be bypassed without compromising clock integrity. Other logical elements can also be present in the TX logical sub-block 306, such as lane reversal 318, LFSR 320, symbol alignment 322, etc. The logical PHY can also include a common retry buffer 340, since all the protocols are Flit based.

The logical PHY can include an RX logical sub-block 308. RX logical sub-block 308 can include an FEC decoder/ bypass 322, CRC decode/bypass 334, and an error reporting element 336. The FEC decoder 332 can decode ECC bits in received data blocks and perform error correction. The CRC decode logic 334 can check for errors that are not correctable and report errors to the error reporting element 336. The retry buffer 340 can be used to signal retry of data blocks with uncorrectable errors. Other logical elements can also be present in the RX logical sub-block 308, such as lane reversal 330, LFSR 328, elasticity/drift buffer 328, symbol alignment 324, etc.

The logical PHY 304 may also include a static mux (not shown in the figure) to choose between the different protocol stacks the PHY 300 supports. The use of a static MUX facilitates reuse of logic elements (including substantial part of what is traditionally a link layer function, such as CRC and Retry), and results in area/power efficiency in addition to the pin efficiency and flexible I/O support (the ability to choose between the different protocol depending on the system configuration). The static mux can direct data towards the appropriate physical and logical elements based on Flit size associated with the protocol being used, and direct the data towards the appropriate CRC encoders/ decoders and FEC encoders/decoders.

The use of a common PHY 300 (analog PHY 302 plus Logical PHY 304), the Flit size, FEC, and CRC can be potentially different between different protocols and operating conditions. Any additional logic to facilitate the common PHY is less costly than replicating the logical PHY stack multiple times for each protocol. Instead, data can be directed electrically to the appropriate encoders/decoders based on the protocol being used, which is set initially during link initialization.

This disclosure uses the following mechanisms to address different aspects in testing and characterizing a Link:
  Error injection at Flit level in the Transmit side;
  Error injection at Receive side for replay;
  Error injection at Ordered Set level at Transmitter and/or Receiver;
  Measurement of Ack/Nak/replay latency covering the Transmit-Receive round-trip in the Link.

Advantages of the present disclosure are readily apparent to those of skill in the art. Among the advantages include, but are not limited to, testing and characterizing the Link in-system in an architected and automated way that will help in qualifying the link with a time to market advantage. The techniques and logic circuitry can also be deployed in server to help identify root causes of and debug malfunctioning components.

Figure 4A:
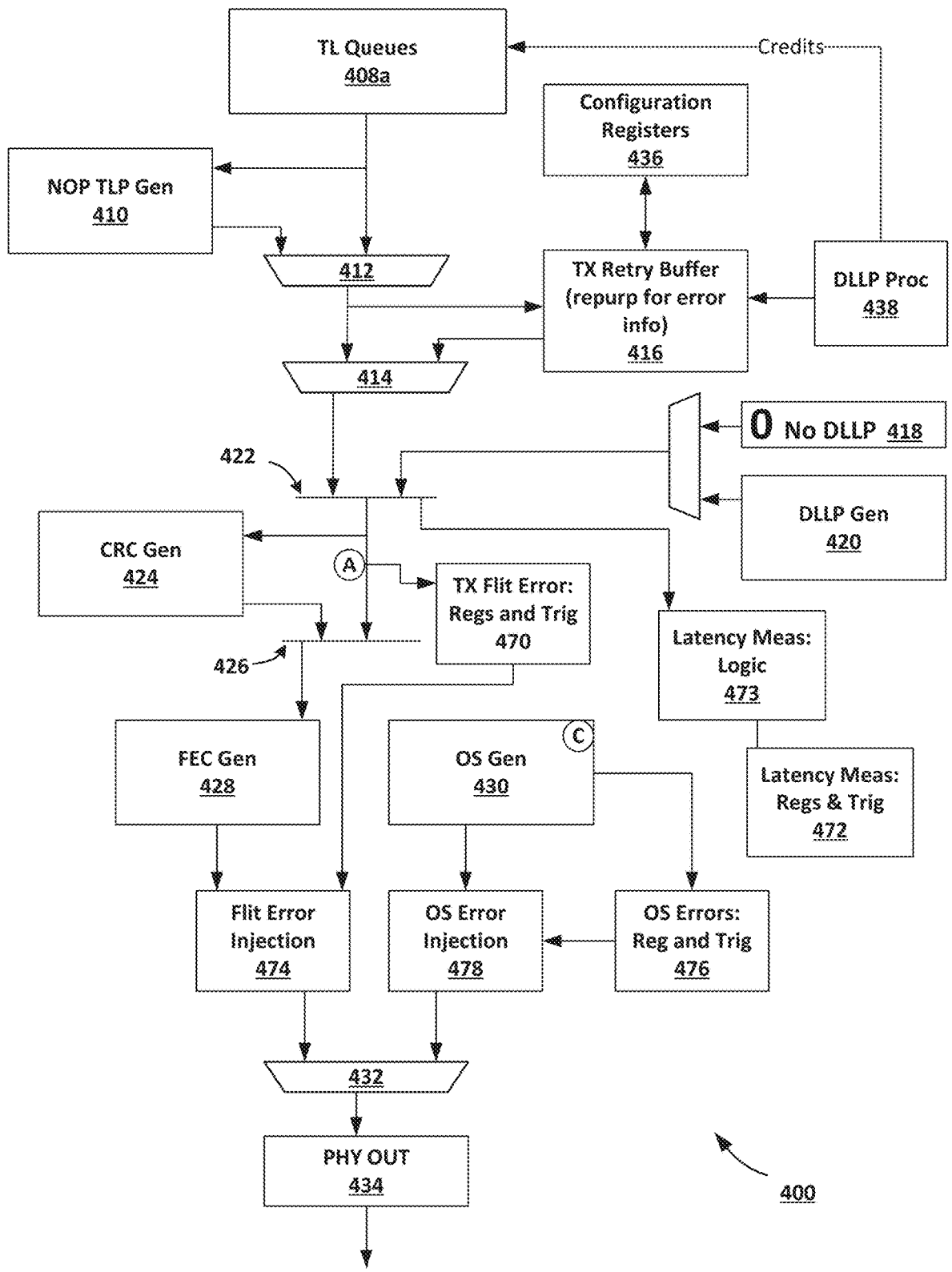
FIGS. 4A-B are schematic diagrams illustrating example circuitry and logic within a protocol stack including Flit error counters and jitter insertion circuitry in accordance with embodiments of the present disclosure.
Figure 4B:
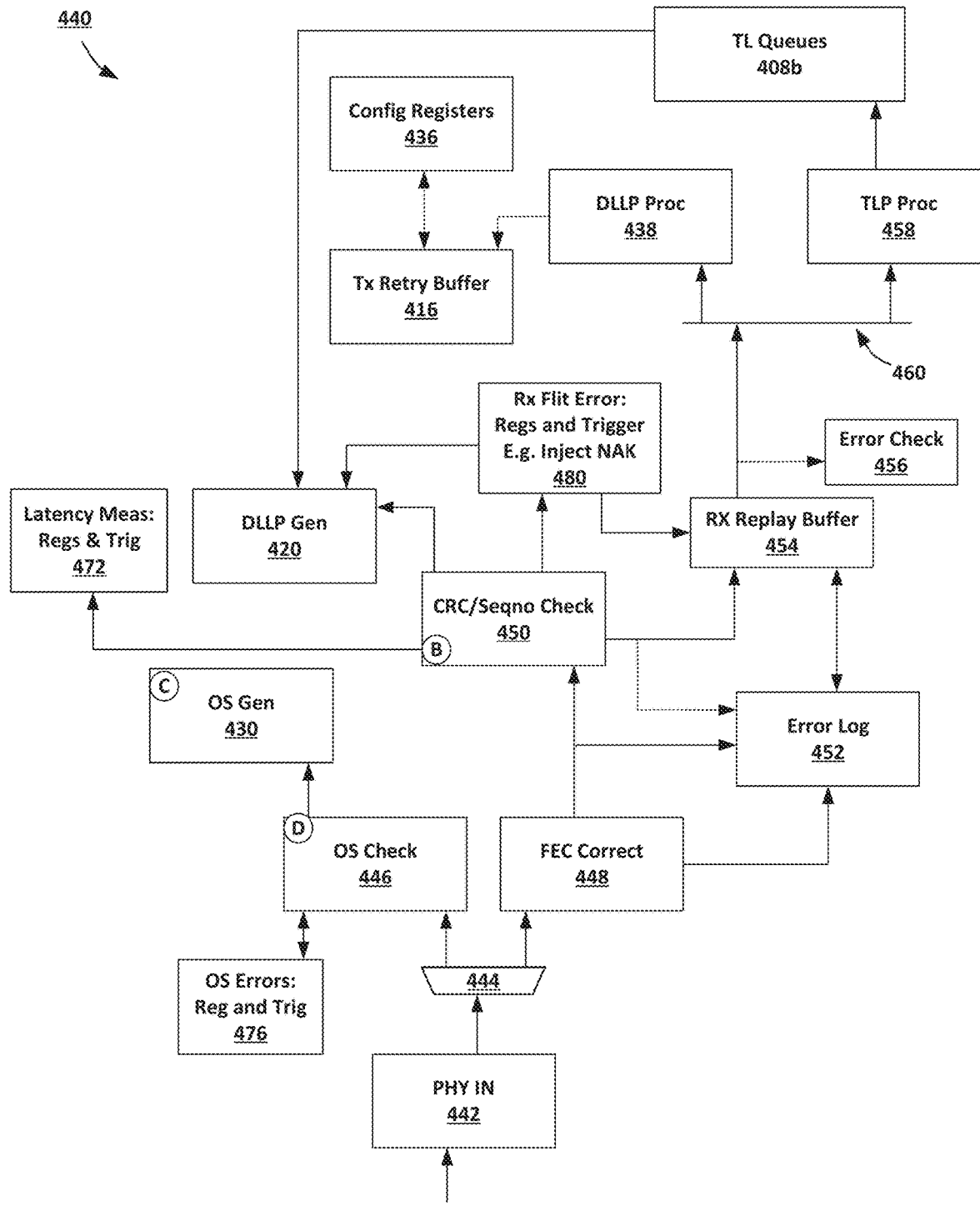

FIGS. 4A-B are schematic diagrams illustrating example circuitry and logic within a protocol stack including error logging mechanisms in accordance with embodiments of the present disclosure. FIGS. 4A-B demonstrate an example micro-architecture implementing the physical, link, and transaction layers of serial interconnects such as PCIe/CXL/ UPI. The disclosure describes multiple detection and logging mechanisms, as shown in FIGS. 4A-B.

FIG. 4A illustrates a logic circuitry of a protocol stack 400 showing some elements of a transmitter side of the micro-architecture. The protocol stack 400 can include transaction layer (TL) queues 408a, a No Operation transaction layer packet (NOP TLP) generator 410, and a TX retry buffer 416.

The TL queues 408a can include logic to store or buffer outbound transaction layer information, payload data, control data, etc. for an outbound packet. The NOP TLP generator 410 can generate NOP TLPs that can be included in a NOP Flit that is transmitted by the transmitter across the link. A NOP Flit can be considered a Flit that does not contain transaction layer packet. In some instances, the NOP Flit can include no DLLP payload (i.e., all 0s in DLLP payload). This will be referred to as an IDLE Flit. In some instances, a NOP Flit (specifically the IDLE Flit type) can be transmitted for the receiver to use to check errors and increase the likelihood of retried packets being corrected. Information from TL queues 408a can be muxed with information from the NOP TLP Gen 410 by mux 412.

The TX retry buffer 416 can be used to temporarily store packets (TLP payload) for retransmission if an error occurred during a previous Flit or the current Flit. A portion of the TX retry buffer 416 can be repurposed for storing error information in some implementations, such as those without available configuration register space. The DLLP processor 438 (shown among some elements of the receiver side protocol stack 450) can provide an ACK/NACK response to the retry buffer 416 to either cause the TLP in the retry buffer 416 to resend or to clear. The DLLP processor 438 can use information about errors in a Flit to cause a new Flit to be transmitted across the link.

The protocol stack 400 can include a data link layer packet (DLLP) generator 420 for generating DLLP information for the packet. The DLLP information can be augmented to a TLP by a mux/merge 422. The output of the TX retry buffer can be muxed with the output of mux 412 by a mux 414. The output of mux 414 can be mux/merged with either all zeros 418, which can be used for error checking as described later, or with the product of the DLLP generator 420.

The protocol stack 400 can also include a cyclic redundancy check (CRC) code generator 424 that can generate CRC for the outbound Flit. The CRC code can be mux/ merged 426 with the outbound Flit. A forward error correction (FEC) generator 428 can add error correcting code (ECC) as described above. ECC can be interleaved across each lane of the Flit using three groups of ECC.

An ordered set (OS) generator 430 can provide ordered sets as Flit payload. For example, the OS generator 430 can provide SKiP (SKP) OS into the Flit stream. SKP OS can be used to indicate that a next Flit is an all-zero Flit, as described more below.

The Flits can be transmitted out of the PHY output 434, which can include an analog front end (AFE), scrambling operations, serialization, etc.

Errors can be injected into Flits by logic circuitry that is part of the protocol stack transmitter side 400, such as physical layer circuitry Flit Error Injection 474. Errors can include bit flips (e.g., from a 0 to a 1 or a 1 to a 0, or other types of errors across the Flit).

Flit Error Injection circuitry 474 can include hardware circuitry to flip bit values in a Flit, data block, or other structure of information. The Flit Error Injection 474 can inject errors based on several factors stored in or controlled by configuration registers, such as a Transmitter (TX) Flit Error Register and Trigger element 470. The Flit error injection circuitry 474 can inject errors into a Flit after ECC are calculated for the Payload. This way, the FEC can be used to identify errors on the receiver-side. Similarly, CRC is calculated and encoded prior to error injection.

Table 1 represents the configuration register and the description of the bits to inject one or more errors in the transmitted Flit(s), when enabled (bit 0). Point A in FIG. 4A provides the trigger in a TX Flit Error Register and Trigger element 470 in terms of the type of Flit being transmitted to act according to the Flit Type (bits 10 and 9 in Table 1). Once the error needs to be injected, as determined by TX Flit Error Register and Trigger element 470, the bytes to be injected an error with a corresponding magnitude is injected by a Flit Error Injection logical element 474. Flit Error Injection logical element 474 can include logic circuitry to introduce or inject errors into a Flit. For example, the Flit Error Injection logical element 474 can cause bit flips in one or more bits of the Flit payload. Notably, the Flit Error Injection logical element 474 resides after the FEC generation 428 has calculated the error correcting code for the Flit payload (including one or both of TLPs or DLPs).

turned on and off using, e.g., power states, quality of service, or other operational modalities that can trigger link retraining; however, these modalities would likely cause a reinitialization and/or renegotiation of link parameters.

At the outset, a Link partner, such as a host device or an endpoint device, can include protocol stack circuitry to activate error injection or to determine that error injection is activated (502). For example, information in the TX Flit Error Register (or other configuration register that can control error injection) can indicate that error injection is activated. The TX Flit Error Register can also provide other types of information, as noted in Table 1.

In embodiments, errors are injected into Flits at the start of a new Flit or series of Flits (504). Further, and for example, even if multiple Flits in a series will have errors

TABLE 1

TX Configuration Register and Description

| Field | Bits | Comments | |
|---|---|---|---|
| Enable | 0 | Armed when 1b (b stands for binary) | |
| Number of errors injected | 5:1 | 00000b: inject till disabled (Bit 0 is 0b)<br>Rest: Exact number | |
| Spacing between occurrences in terms of number of Flits | 8:6 | 000b: Random number between 1 and 127, no repeat till other numbers are used<br>Rest: Exact number of Flits apart, as encoded to be armed for the next available Flit | |
| Injection on Flit type | 10:9 | 00b: Any Flit<br>01b: Any non-IDLE Flit<br>10b: Only on Payload Flit<br>11b: Only on NOP Flit | |
| Error type being injected | 12:11 | 00b: Random between correctable or uncorrectable<br>01b: Correctable error only in one FEC group (rotate across the groups in subsequent injections)<br>10b: Correctable error only in all 3 FEC groups simultaneously<br>11b: Uncorrectable error only | |
| Consecutive error injection | 14:13 | 00b: Random number of consecutive Flits between 1 to 10<br>01: One Flit only<br>10: Two consecutive Flits<br>11: Three consecutive Flits | Even if multiple consecutive Flits will be injected as an error, it can count as one occurrence. The error injection can continue even if the subsequent Flit is not of the same type (i.e., error injection is supposed to be on Payload Flit but for 2 consecutive Flits, both Flits must be injected with error(s) even if the second Flit is a NOP Flit) |
| Error offset | 21:15 | For correctable error(s): Byte offset for error injection for correctable errors<br>For uncorrectable error(s): Distance between subsequent error bytes | |
| Error magnitude | 29:22 | 00h: Random non-0 value<br>Rest: exact error magnitude | |
| Error injection status | 31:30 | 00b: Not started; 01b: started and in progress; 10b: Completed; 11b: Reserved | |

Figure 5:
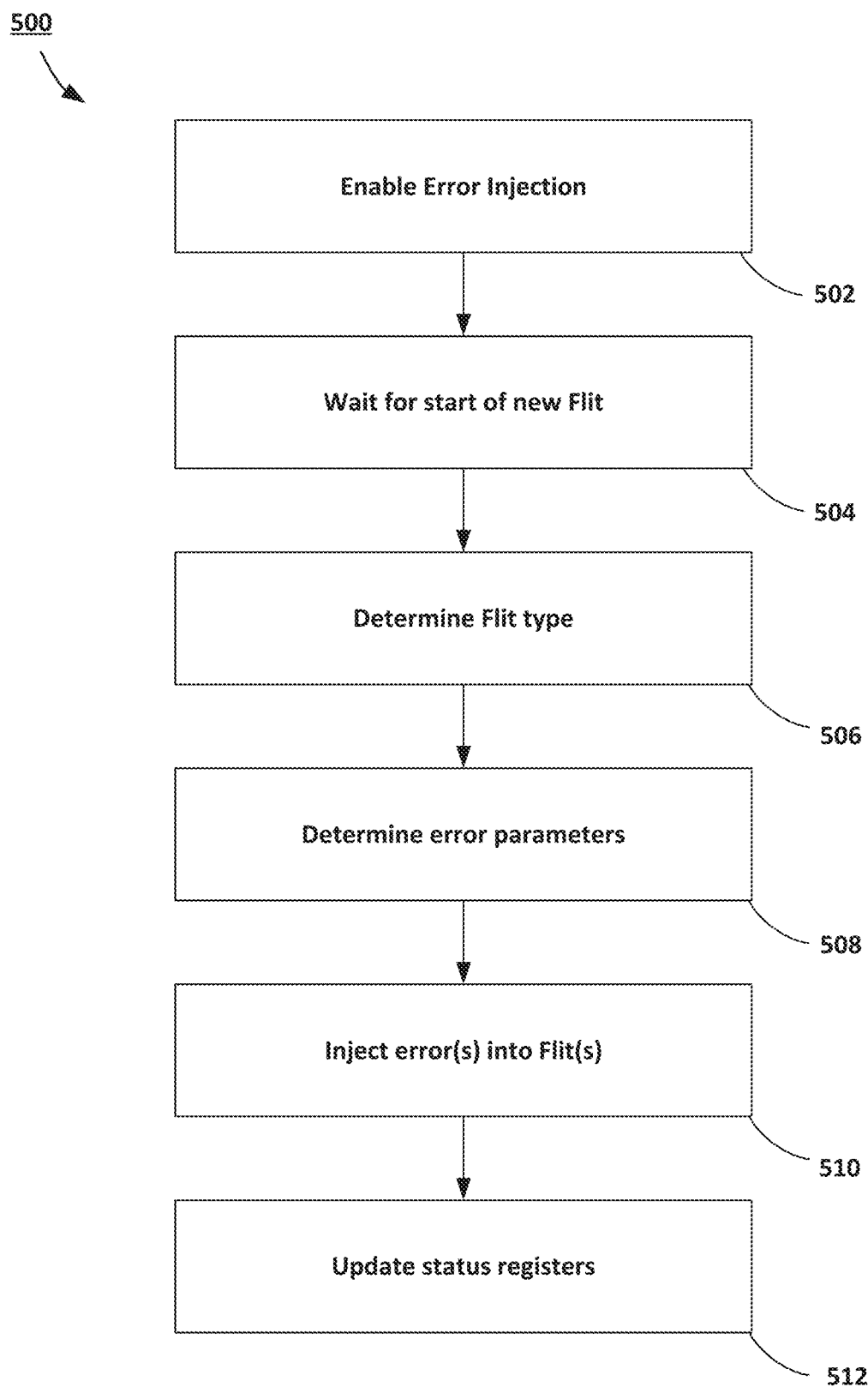
FIG. 5 is a process flow diagram for injecting errors into a Flit in accordance with embodiments of the present disclosure.

FIG. 5 is a process flow diagram 500 for injecting errors into a Flit in accordance with embodiments of the present disclosure. In some embodiments, the error injection mechanisms are activated when the Link is operating in Flit mode. Flit mode can be turned on by the Link partners during Link initialization, negotiation, handshake, etc. If Flit mode is supported by each Link partner, the Link partners can turn on Flit mode. Flit mode can follow required operational features of PCIe 6 or higher, as well as optional features, based on implementation choices. Link partners tend to operate in flit mode until the link is reset, reinitialized, or renegotiated. In some cases, flit mode can be dynamically injected, on the receiver side, the errors will be counted as one occurrence of the error. This condition can be referred to as the consecutive Flit rule.

The protocol stack circuitry can determine various error injection parameters from the TX Flit Error Registers, including Flit type (506) and other error parameters (508). Flit type can include a payload Flit, IDLE Flit, No Operation (NOP) Flit, ordered set (OS) Flit or OS structure, etc. Other error parameters can include the number of errors injected, the spacing between occurrences in terms of the number of Flits, the type of error being injected (e.g., correctable, uncorrectable, combination, etc.), consecutive error injection, error offset, error magnitude, etc. Table 1 provides more details.

The errors can be included into the Flit(s) (510). Errors can include bit flips or other types of errors. For example, after a Flit is constructed (and in some cases, after error correcting code is calculated for the Flit payload), the errors can be introduced or injected into the Flit by logic circuitry that flips one or more bits in the Flit payload.

After the errors have been injected into the Flit(s), the protocol stack circuitry can update the configuration register status information to reflect that error injection is completed (512).

The following is an example algorithm for injecting errors into a Flit. It is understood that the following algorithm is for example purposes and is not limiting. Other processes and implementations may be chosen to achieve similar results.

1. If error injection is activated (i.e., Enable-Bit 0=1b), go to Step 2; else stay in Step 1 until error injection is activated;
2. Certain variables can be initialized:
   num_errors_injected=0, consecutive_Flit_inject=0, distance_inject_Flits=0, fec_group=0;
3. If a next set of bits scheduled to be transmitted is a new Flit, go to Step 4; else stay in Step 3 until the next set of bits scheduled to be transmitted is a new Flit;
4. If (consecutive_Flit_inject>0) begin II need to inject in this Flit due to consecutive requirement:
   a. consecutive_Flit_inject−−;
   b. Go to Step 8;
5. If ((num_errors_injected==Number of errors injected−Bits[5:1]) && (num_errors_injected>0)),
   Set Error Injection Status (Bits 31:30) to 10b and Go to Step 1//Completed error injection;
6. If (distance_inject_Flits>0) begin //too close to the last Flit with errors injected:
   a. distance_inject_Flits−−;
   b. Go to Step 3;
   end.
7. If (((Injection on Flit Type-bits[10:9])==00b)||
   (New Flit to be transmitted is NOP and (Injection on Flit Type==01b or 11b))||
   (New Flit to be transmitted is Payload Flit and (Injection on Flit Type==01b or 10b))), then
   begin //Right type of Flit to inject error:
     if (num_errors_injected==0) set Error Injection Status (bits 31:30) to 01b num_errors_injected++;
     distance_inject_Flits=spacing between occurrences in terms of number of Flits (Bits [8:6]);
     if (distance_inject_Flits==0) distance_inject_Flits= random number between 1 to 127;
     consecutive_Flit_inject=consecutive error injection (Bits [14:13]);
     if (consecutive_Flit_inject==0) consecutive_Flit_inject=random number between 1 to 10;
     consecutive_Flit_inject−−;
   end;
   else: Go to Step 3.
8. If ((Error Type being Injected (Bits [12:11])==11b)||
   ((Error Type being Injected==00b) && (1-bit random number generator==0)))
   Go to Step 10//Uncorrectable Error injection
9. //Correctable Error injection:
   a. error_magnitude=Error magnitude (Bit[31:24]);
   b. if (error_magnitude==0) error_magnitude=random number between 1 to 255;
   c. Inject error(s) of magnitude error_magnitude in byte location (Error Offset-Bits [21:15]) in the FEC group fec_group;
   d. fec_group=(fec_group+1) mod 3;
   e. if ((Error Type being injected (Bits 12:11)==10b) && (fec_group !=0)) Go to Step 9a;
   f. Go to Step 3;
10. //Uncorrectable Error injection:
    a. error_locn=0;
    b. error_magnitude=Error magnitude (Bit[31:24]);
    c. if (error_magnitude==0) error_magnitude=random number between min (error_locn, 1) to 255//This allows for no errors in Byte 0—so we get more of a randomizing effect;
    d. Inject error(s) of magnitude error_magnitude in byte location error_locn;
    e. error_locn+=Error Offset (Bit[21:15]);
    f. if (error_locn>Flit Size) Go to Step 3;
    g. Go to Step 10b.

The num_errors_injected and consecutive_Flit_inject variables can also be added to the status register to signal completion as well as the exact current status. When software write to any bit in this register, the 'Error Injection Status' bits are set to 00b.

In general, determining error parameters for Flits can include determining one or more of the number of errors injected, the spacing between error occurrences, the error type being injected, consecutive error injection, error offset, or error magnitude.

The number of errors injected can include injecting errors until error injection is disabled or can include injecting a specified number of errors. The spacing between error occurrences can include a spacing between occurrences in terms of the number of Flits between Flits with errors. For example, the spacing can be a random number, such as a random number of Flits between errors between 1 and 127, without repeated spacing until all random numbers are used. The spacing can be a specified number of Flits, keeping in mind the consecutive Flit rule. The error type can include a random error type between a correctable error or an uncorrectable error, a correctable error in one FEC group; a correctable error in all three FEC groups, or an uncorrectable error.

Consecutive error injection can include injecting errors into a certain number of consecutive Flits (including just one Flit). For example, the consecutive error injection bit can cause a single Flit to be injected with an error, two consecutive Flits to be injected with an error, three consecutive Flits to be injected with an error, or a random number of consecutive Flits to be injected with an error.

Error offset can be different for correctable errors than for uncorrectable errors. For correctable errors, the error offset can determine the byte offset for error injection. For uncorrectable errors, the error offset can determine the distance between subsequent error bytes.

The error magnitude can be a random non-0 value or can be an exact error magnitude. Error magnitude can define magnitude of the error injected. The error magnitude can include a number of bits flipped in a single Flit, for example.

Turning to the receiver-side, FIG. 4B illustrates a logic circuitry of a protocol stack 440 of a receiver side of the microarchitecture. A Flit can be received by a receiver port's PHY input 442. The PHY input 442 can include an AFE, descrambling operations, and other operations found in the PHY input. The Flit can be demuxed by demux 444 for being an OS Flit by OS check 446 or a payload Flit. The payload Flit can undergo error detection by FEC logic 448 that uses the ECC to identify and correct errors within the Flit. The outcome of error detection can be logged in error log 442, as described in more detail below. The Flit can also undergo CRC checks by CRC logic 450. The CRC logic 450 can detect errors at log errors as described below using functions found in error check logic 446. The error check logic 446 can also use stored information in the RX replay buffer 444, if present, to identify bit locations of uncorrectable errors. The Flit is split by demerge 460, and an ACK/NACK is provided to TX retry buffer 416 by the DLLP processor 438. The TLP processor 448 can send the payload to the transaction layer queues 408b.

In some embodiments error check logic 446 can also provide a bit error rate (BER) based on the errors received by one or more counters and based on the number of bits received as determined by the Flit counter and the errors reported by the FEC Correct logic 448 feeding into CRC/ Seqno check logic 450. In PCIe, as in other interconnects such as CXL, UPI, etc., Flits contain a fixed number of bits, which means that a total number of bits can be determined by counting the number of Flits received. The errors can be compared against the total number of bits to compute a BER.

The protocol stack circuitry 440 can include logic circuitry and registers for injection errors into received Flit(s). Table 2 represents the configuration register and the description of the bits to inject one or more errors in the received Flit(s), when enabled (bit 0). Point B in FIG. 4B provides the trigger in terms of the type of Flit being received to act according to the Flit Type (Bit 14). The RX Flit Error logical element 480 makes the determination if an error (NAK) needs to be injected and injects it, as shown in FIG. 4B. RX Flit Error logical element 480 can include hardware circuitry and registers and other information to trigger injecting NAK into received Flit(s).

TABLE 2

Config Regs for Error Injection at Port's Receiver

| Field | Bits | Comments | |
|---|---|---|---|
| Enable | 0 | Armed when 1b | |
| Number of errors injected | 5:1 | 00000b: inject till disabled (Bit 0 is 0b)<br>Rest: Exact number | |
| Spacing between occurrences of artificial NAK in terms of number of Flits | 13:6 | 0000b: Random between 1 to 127<br>Rest: number of Flits apart | |
| Injection on Flit type | 14 | 0b: Any Flit<br>1b: Only on Payload Flit | |
| Force a Replay only Flit | 15 | When 1b, forces a receiver to do a Replay only Flit followed by a replay from the same sequence number after a spacing 9:6 - the subsequent NAK is shifted by the same amount | |
| Multiple replay requests to same sequence number | 17:16 | 00b: Not enabled<br>01: Two NAKs to same sequence number after the spacing<br>10: 3 NAKs<br>11: 4 NAKs | |
| Consecutive error injection | 19:18 | 00b: Random number of consecutive Flits between 1 to 10<br>01: One Flit only<br>10: Two consecutive Flits<br>11: Three consecutive Flits | Even if multiple consecutive Flits will be injected as an error, it can count as one occurrence. The error injection can continue even if the subsequent Flit is not of the same type (i.e., if error injection is supposed to be on Payload Flit but for 2 consecutive Flits, both Flits must be injected with error(s) even if the second Flit is a NOP Flit) |
| Error offset | 19:18 | For correctable error(s): Byte offset for error injection for correctable errors<br>For uncorrectable error(s): Distance between subsequent error bytes | |
| Error magnitude | 21:20 | 00h: Random non-0 value<br>Rest: exact error magnitude | |

Figure 6:
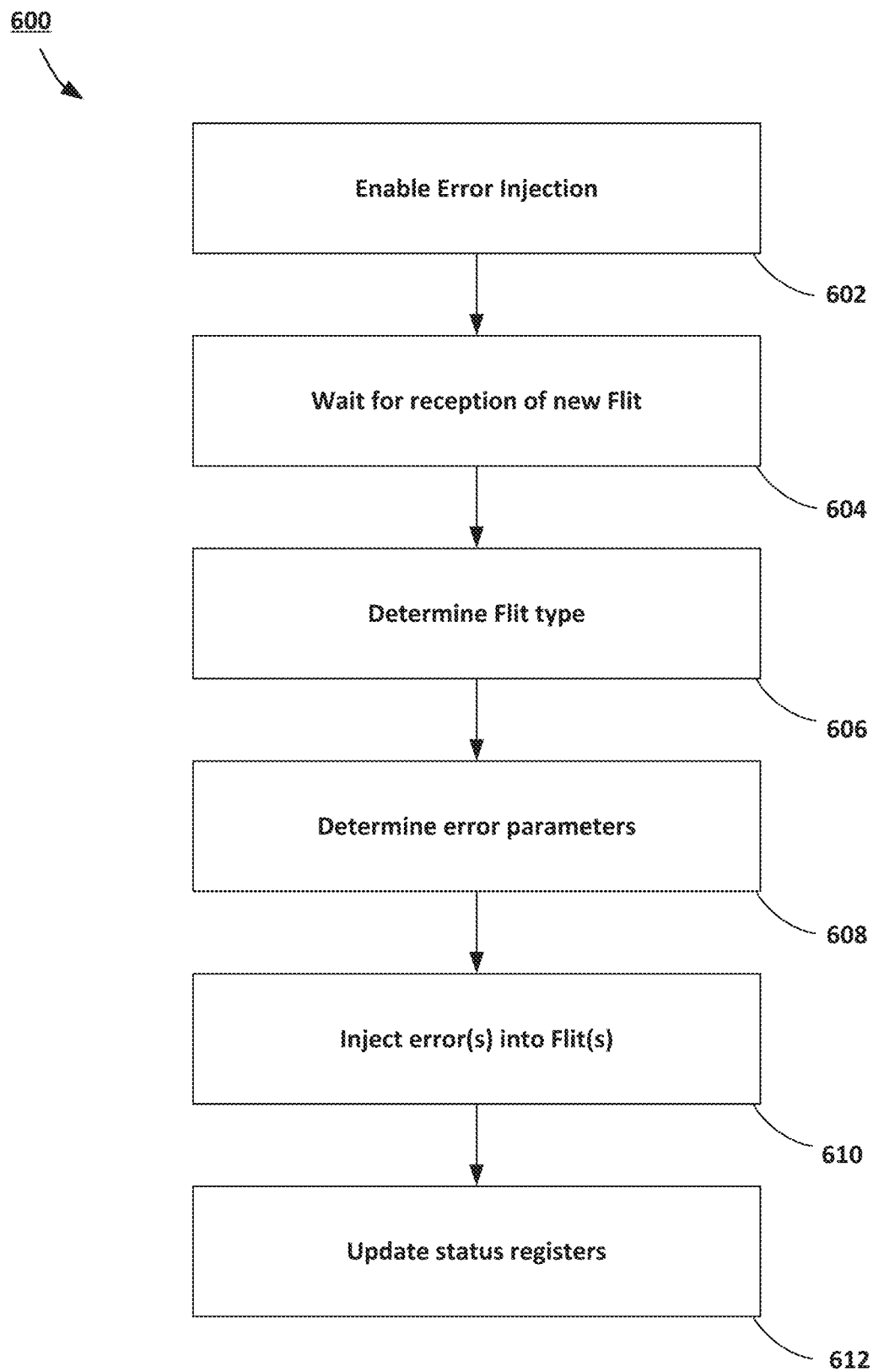
FIG. 6 is a process flow diagram for injecting errors into a Flit in accordance with embodiments of the present disclosure.

FIG. 6 is a process flow diagram 600 for injecting errors into a Flit in accordance with embodiments of the present disclosure. In some embodiments, the error injection mechanisms are activated when the Link is operating in Flit mode. Flit mode can be turned on by the Link partners during Link initialization, negotiation, handshake, etc. If Flit mode is supported by each Link partner, the Link partners can turn on Flit mode. Flit mode can follow required operational features of PCIe 6 or higher, as well as optional features, based on implementation choices.

At the outset, a Link partner, such as a host device or an endpoint device, can include protocol stack circuitry to activate error injection or to determine that error injection is activated (602). For example, information in the RX Flit Error Register (or other configuration register that can control error injection) can indicate that error injection is activated. The RX Flit Error Register can also provide other types of information, as noted in Table 2.

In embodiments, errors are injected into Flits at the reception of a new Flit or series of Flits (604). Further, and for example, even if multiple Flits in a series will have errors injected, on the receiver side, the errors will be counted as one occurrence of the error. This condition can be referred to as the consecutive Flit rule.

The protocol stack circuitry can determine various error injection parameters from the TX Flit Error Registers, including Flit type (606) and other error parameters (608). Flit type can include a payload Flit or other type of Flit. Other error parameters can include the number of errors injected, the spacing between occurrences in terms of the number of Flits, the type of error being injected (e.g., correctable, uncorrectable, combination, etc.), consecutive error injection, error offset, error magnitude, etc. Table 2 provides more details.

The errors can be included into the Flit(s) (610). Errors can include injecting a NAK or other type of negative acknowledgment or error on the receiver side. In some embodiments, injecting an error, such as a NAK, can be used to trigger or force a Replay of the received Flit.

After the errors have been injected into the Flit(s), the protocol stack circuitry can update the configuration register status information to reflect that error injection is completed (612).

The NAK that is injected can trigger a replay of a Flit. The replay can be used to test and characterize the replay mechanisms and to determine latency for replayed Flits.

The configuration registers for error injection at a port's receiver can include a trigger for turning the error injection mechanism on and off (e.g., enable bit). The configuration registers also provide an indication for various error injection parameters. For example, the configuration registers can include information indicating a number of errors injected. The errors can be continuously injected until the error injection is turned off. Or, in some embodiments, a predetermined number of errors can be specified using information in the register.

Another parameter can include the spacing between occurrences of errors, which can also be indicated by information in the registers. The errors can be spaced apart in terms of the number of Flits between Flits in which the artificial NAK is injected. The spacing can be a random number of Flits or can be a specified number of Flits.

Another parameter that can be indicated by the configuration registers is a force replay only Flit. When set, this configuration register information causes a receiver to do a replay only Flit followed by a replay from the same sequence number after a spacing; a subsequent NAK can be shifted by the same amount.

Another parameter for error injection can include whether or not to include multiple replay requests to the same sequence number. If enabled, two, three, or four NAKs can be injected to the same sequence number after the Flit spacing designated elsewhere in the register.

Another parameter can include consecutive error injection. Consecutive error injection can inject errors into consecutive Flits at random Flit frequency between 1 and 10, one Flit only, two consecutive Flits, or three consecutive Flits. Error offset indicates the byte offset for error injection for correctable errors or the distance between subsequent error bytes for uncorrectable errors.

Error magnitude can be a random non-0 value or can be a predetermined error magnitude.

The following algorithm describes an example mechanism for injection errors in a received Flit at a receiver-side protocol stack circuitry.

1. If error injection is enabled (i.e., Enable-Bit 0=1b), go to Step 2; else stay in Step 1;
2. num_errors_injected=0, consecutive_Flit_inject=0, distance_inject_Flits=0, seq_num_inject=0, num_repeat_errors_seqno=0;
3. If next set of bits scheduled to be received is a new Flit, go to Step 4; else stay in Step 3;
4. If (consecutive_Flit_inject>0) begin //need to inject in this Flit due to consecutive requirement:
a. consecutive_Flit_inject--;
b. Go to Step 9;
5. If ((num_errors_injected>=Number of errors injected-Bits[5:1]) && (num_errors_injected>0) && (num_repeat_errors_seqno==0));
Set Error Injection Status (Bits 31:30) to 10b and Go to Step 1//Completed error injection;
6. If ((seq_num_inject>0) && (received sequence number=seq_num_inject) && (seq_num_inject>0)) begin //Inject NAK to the same sequence number repeatedly;
a. seq_num_inject--;
b. num_errors_injected++;
c. If (Force a Replay only Flit (Bit 15)==1b) begin:
c.i. Generate NAK for the received Flit causing a Replay request of Flit No. seq_num_inject
c.ii. If (Spacing between occurrences of artificial NAK (Bits 13:6)>0) Schedule a 'Go back n' replay from seq_num_inject after the number of Flits indicated in Bits [13:6]
end
else: Generate NAK for the received Flit causing a go-back-n Replay request from Flit No. seq_num_inject
d. Go to Step 3
end.
7. If (distance_inject_Flits>0) begin //too close to the last Flit with errors injected
a. distance_inject_Flits-
b. Go to Step 3
end
8. If ((Received Flit Type is Payload Flit II (Injection on Flit Type (Bit 14)==0b)) && (num_errors_injected< Number of errors injected))
begin //Right type of Flit to inject error
if (num_errors_injected==0) Error Injection Status (bits 21:20) to 01b
num_errors_injected++;
distance_inject_Flits=Spacing between occurrences of artificial "NAK" in terms of number of Flits (Bits [13:6])
if (distance_inject_Flits==0) distance_inject_Flits= random number between 1 to 127;
consecutive_Flit_inject=consecutive error injection (Bits [19:18]);
if (consecutive_Flit_inject==0) consecutive_Flit_ inject=random number between 1 to 10;
consecutive_Flit_inject--;
End
else: Go to Step 3
9. //Inject an error on receive side
a. If ((Multiple replay requests to same sequence number (Bits 17:16) !=00b) && (seq_num_inject==0)) begin
a.i. seq_num_inject=Multiple replay requests to same sequence number-1;

a.ii. num_repeat_errors_seqno=sequence number of received Flit
end
b. num_errors_injected++
c. If (Force a Replay only Flit (Bit 15), 1b) begin
c.i. Generate NAK for the received Flit causing a Replay request of Flit No. seq_num_inject
c.ii. If (Spacing between occurrences of artificial NAK (Bits 13:6)>0) Schedule a 'Go back n' replay from seq_num_inject after the number of Flits indicated in Bits [13:6]
end
else: Generate NAK for the received Flit causing a go-back-n Replay request from Flit No. seq_num_inject
d. Go to Step 3

The num_errors_injected and consecutive_Flit_inject variables can also be added to the status register to signal completion as well as the exact current status. When software write to any bit in this register, the 'Error Injection Status' bits are set to 00b.

Returning to FIGS. 4A and 4B, embodiments of the disclosure can include injection errors into transmitted and received ordered sets (OS). On the transmitter side of the protocol stack, errors can be injected into OS based on OS triggers in an OS Error Injection register and trigger logical element 476. OS Error Injection register and trigger logical element 476 can include registers and other information to activate/trigger and configure error injection into OS on the transmit side. The OS Error Injection register and trigger logical element 476 can cause an OS Error Injection circuit 478 to insert errors into a generated OS series of bytes. The OS Error injection circuit 478 can include hardware circuitry to cause bit flips in OS bytes generated by the OS Generation circuit 430. Either a Flit or an OS series are transmitted from the transmitter side of the protocol stack circuitry. On the receiver side, OS Error Injection register and trigger logical element 476 can cause the OS check 446 to consider the received OS to have failed.

Table 3 represents the configuration register and the description of the bits to inject one or more errors in the transmitted and/or received Ordered Set(s), when enabled (bit 0). The OS Gen logic circuitry 430 and the OS check logic circuitry 446 in FIGS. 4A and 4B, respectively, provide the trigger input that OS Error Injection register and trigger logical element 476 uses to evaluate when to inject errors. If the error injection needs to be on the transmitted Ordered Set(s), it instructs OS Error Injection circuit 478 to perform the injection. A trigger can include of the OS error inject bit is enabled (1b). Error injection can include one or more bit flips in the ordered set. If it needs to be on the received Ordered Set(s), it instructs the receive side OS check circuit 446 to pretend that the Ordered Set failed (e.g., by compelling a replay or by injecting a NAK). The error injection mechanism can be based on the type of the Ordered Set, the LTSSM State(s) (one bit per state) where the injection needs to be performed, or other factors.

TABLE 3

Error injection in Transmitted and Received Ordered Sets

| Field | Bits | Comments |
|---|---|---|
| Enable | 0 | Armed when 1b - could be port-wide so that all Lanes are armed simultaneously |

TABLE 3-continued

Error injection in Transmitted and Received Ordered Sets

| Field | Bits | Comments |
|---|---|---|
| Lane number | 16:1 | 00000b: inject till disabled (Bit 0 is 0b) Rest: Exact number |
| Direction | 18:17 | Bit 17: TX side Bit 18: RX side: A device is permitted to hardwire this to 0b if it does not implement the injection on the RX side |
| Number of occurrences | 23:19 | 00000b: Inject till disabled Rest: Exact number |
| Spacing between occurrences in terms of number of OS | 26:24 | 000b: Random number between 1 and 127, no repeat till other numbers are used Rest: Exact number of OS's apart, as encoded to be armed for the next OS |
| Injection on OS type | 29:27 | 000b: Any OS 001b: TS0 010b: TS1 011b: TS2 100b: SKP OS 101b: EIEOS 110b EIOS 111b: Reserved The bit assignments to corresponding OS type can be different from that shown in this nonlimiting example. |
| Bytes injected | 45:30 | Individual bytes [15:0] where errors (non-0) injected randomly - all 0 => random bytes For SKP OS in 64 GT/s: each bit covers 2.5 Bytes |
| LTSSM State | 49:46 | {Polling, Config, L0, Recover} |
| Error injection status | 51:50 | 00b: Not started; 01b: started and in progress; 10b: Completed; 11b Reserved |

Figure 7:
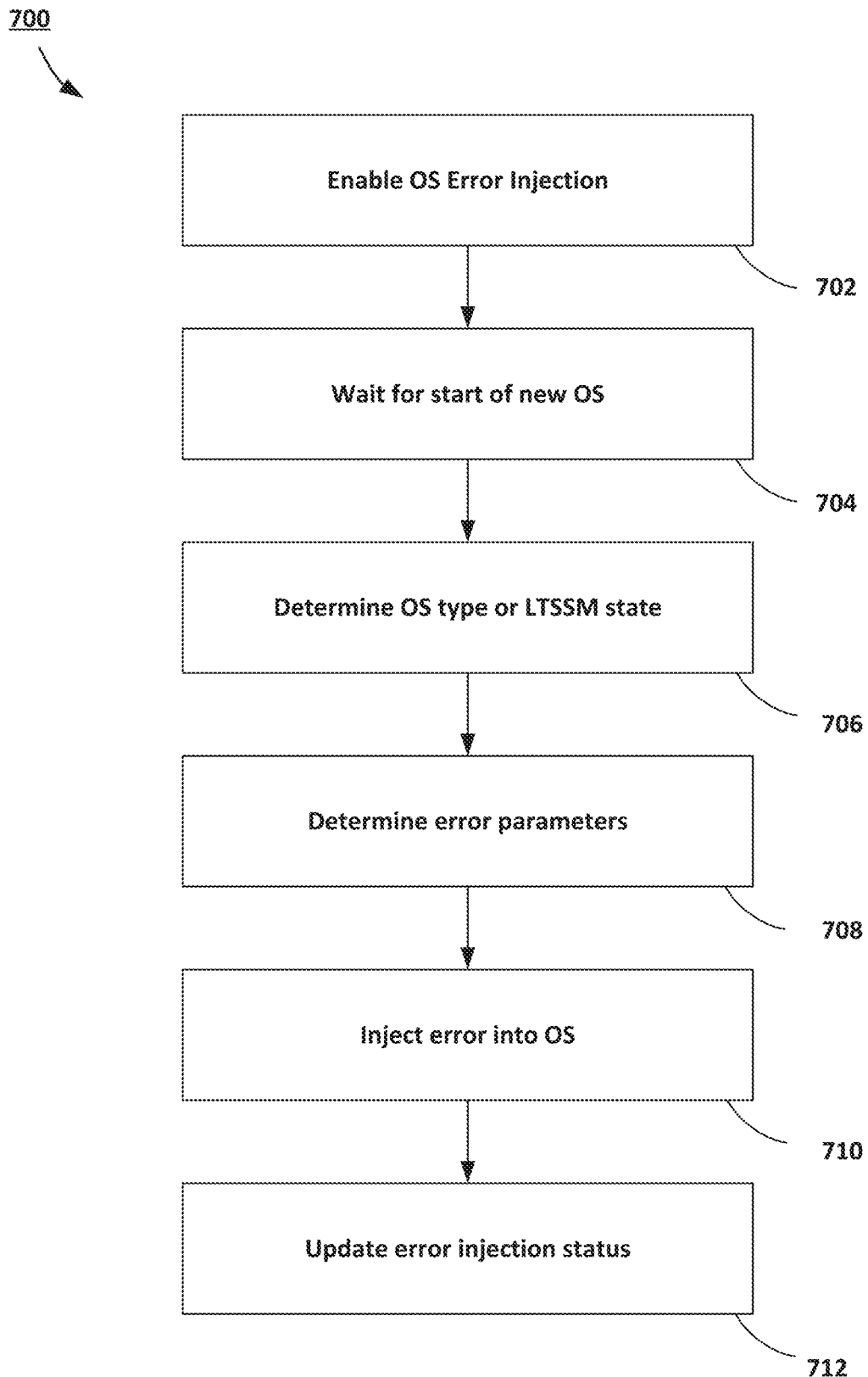
FIG. 7 is a process flow diagram for a transmitter-side protocol stack to inject an error into an ordered set in accordance with embodiments of the present disclosure.

FIG. 7 is a process flow diagram 700 for a transmitter-side protocol stack to inject an error into an ordered set in accordance with embodiments of the present disclosure. At the outset, the error injection feature can be enabled by an enable bit in the OS Error Injection register and trigger logical element 476 (702). At the start of a new OS (704), OS generator logic can inject errors into ordered sets based on a number of parameters identified by the OS Error Injection register and trigger logical element 476. The injection of errors in the OS can be based on the OS type or link training and status state machine (LTSSM) state of the link (706). The error parameters can be determined from the OS Error Injection register and trigger logical element 476 (708). The errors can be injected into the OS by error injection logic 478 (710). And the error injection status can be updated (712).

Figure 8:
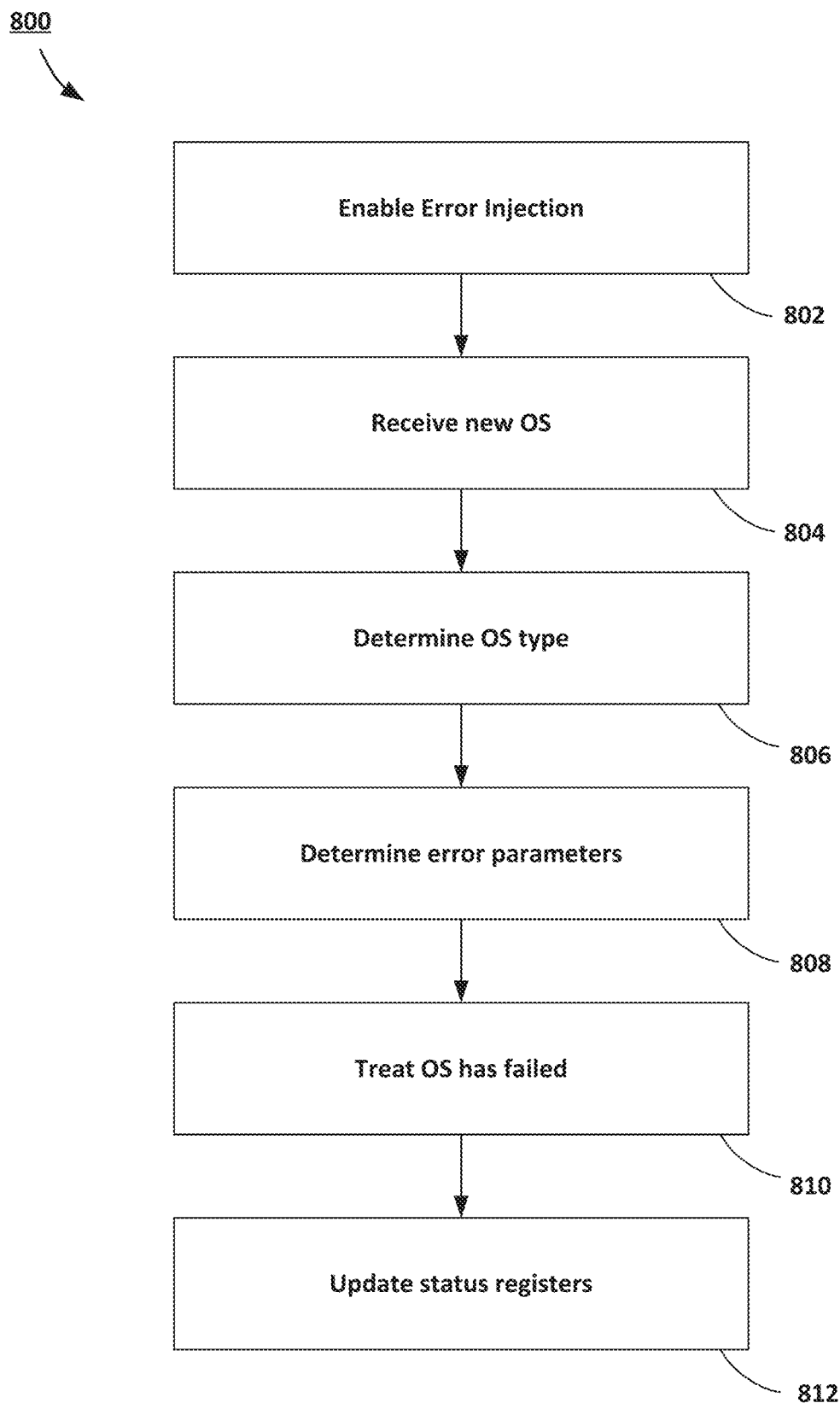
FIG. 8 is a process flow diagram for a receiver-side protocol stack to inject an error into an ordered set in accordance with embodiments of the present disclosure.

FIG. 8 is a process flow diagram 800 for a receiver-side protocol stack to inject an error into an ordered set in accordance with embodiments of the present disclosure. At the outset, the error injection feature can be enabled by an enable bit in the OS Error Injection register and trigger logical element 476 (802). Upon receiving an OS, a receiver can treat a received OS as having failed based on a number of parameters identified by the OS Error Injection register and trigger logical element 476. The treatment of the OS can be based on the OS type or link training and status state machine (LTSSM) state of the link (806). The error parameters can be determined from the OS Error Injection register and trigger logical element 476 (808). The error registers can cause the OS Check logic to treat the incoming OS or sequence of OS as a failed OS (810). And the error injection status can be updated (712).

Examples of error parameters for OS include lane number on which error is injected, the direction (TX side or RX side), the number of occurrences, the spacing between occurrences in terms of a number of OS, the OS type (including any OS, training sequence (TS) 0, TS1, TS2, SKP OS, electrical idle exit OS (EIEOS), or electrical idle OS (EIOS)), the bytes injected, or the LTSSM state.

Error injection can be used to test and characterize various components of a link. For example, error injection can test forward error correction mechanisms, cyclic redundancy check mechanisms, acknowledgment/negative acknowledgment mechanisms, replay capabilities, error handling, bit error rates, link stability, recovery and reinitialization timing and sequencing, etc. In addition, error injection allows for the testing and characterization of latency at the link level. Latency measurement is described more below:

Latency Measurement at Link Level:

Latency measurement at the link level can include counting cycles from when a Flit is scheduled to be transmitted to when an Ack/Nak comes back, ignoring any SKP OS received (or transmitted). If the Ack is for a subsequent Flit, then adjust the time accordingly by adjusting to when the sequence number would have been transmitted (the time is added on the TX side). The Nak to replay delay can be tracked by counting between the time the Nak was scheduled to be sent to when the replay to the said sequence number occurred, ignoring any SKP OS received.

Turning to FIGS. 4A-4B, the protocol stacks 400 and 440 can include latency measurement registers and triggers 472 and a latency measurement logic 473. The latency measurement registers and triggers 472 can include information for activating, deactivating, and configuring latency measurement parameters. The latency measurement registers and trigger 47 can also include register information for reporting the status of latency measurements based on control registry set ups, parameters, etc. The reporting registers can be in the same registry as the latency measurement configuration information and triggers or in a separate registry. Tables 4 and 5 provide the configuration register set-up needed for the control as well as the measurement results in the status.

TABLE 4

Control Register for Latency Measurement for Flits as well as LTSSM state transitions

| Field | Bits | Comments |
|---|---|---|
| Enable | 0 | Armed when 1b |
| Number of occurrences to track | 4:1 | 00000b: 32<br>Rest: exact number |
| Type Tracked | 7:5 | 000b: Ack of any Flit<br>001b: Ack of Payload only Flit<br>010b: Nak of any Flit<br>011b: Nak of Payload only Flit<br>100b: Nak to Replay delay of any Flit (need two back to back Idle Flit errors)<br>101b: Nak to Replay delay of Payload only Flit<br>110b: Recovery delay through software<br>111b: Recovery delay due to error |

TABLE 5

Status register reporting the Latency measurements based on the Control register set up

| Field | Bits | Comments |
|---|---|---|
| Tracking Status | 1:0 | 00b: Not started<br>01b: Stalled<br>10b: Completed - if counter overflow, the number of occurrences tracked may be reduced<br>11b: Error |

TABLE 5-continued

Status register reporting the Latency measurements based on the Control register set up

| Field | Bits | Comments |
|---|---|---|
| Number of occurrences completed | 5:1 | 00000b: 32<br>Rest: exact number |
| Elapsed interval for completed occurrences (aggregate) | 15:6 | Number nsec Ack/Nak/replay delay if tracking up to 8 occurrences<br>For Ack/Nak/replay delay tracking beyond 8 occurrences, represents the number as a multiple of 8 nm (rounded up)<br>For Recovery state: counts the time in Recovery state as a multiple of 32 ns (rounded up) |

The latency measurement registers and triggers 472 can include information storage such as a memory, registers, latches, or other logic circuitry to hold information to activate, configure, perform, and report latency measurements. The latency measurement logic 473 can include hardware or software logic to receive information and calculate a latency. For example, the latency measurement logic 473 can receive information indicating a transmission of a Flit from a transmitter-side protocol stack circuit element in the link layer or elsewhere. The latency measurement logic 473 can also receive information from the CRC check circuit 450 or other circuit element on the receiver-side protocol stack 440 that provides Ack/Nak information about the reception of the Flit.

Figure 9:
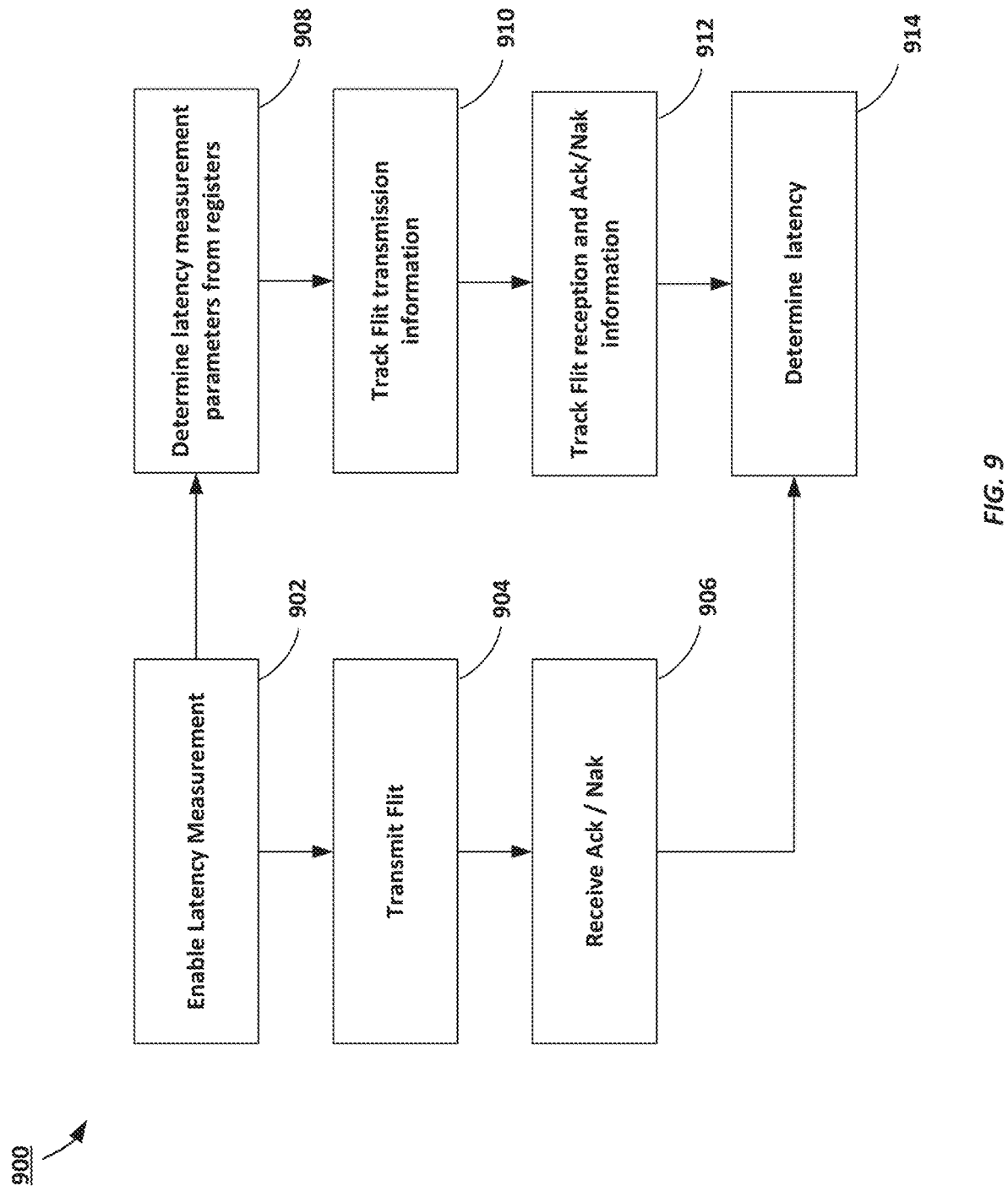
FIG. 9 is a process flow diagram for performing latency measurements in accordance with embodiments of the present disclosure.

FIG. 9 is a process flow diagram 900 for performing latency measurements in accordance with embodiments of the present disclosure. Latency tracking can be turned on and off by setting registry information contained in the latency measurement registers and triggers 472 (902).

When the latency measurement feature is turned on, the latency measurement logic 473 can use information in the latency measurement registers to determine how to calculate latency based on parameters laid out (908). In some embodiments, the latency tracking mechanism can include different modes as specified by information in the registry. For example, in a first mode, one sequence number can be tracked at a time. In another mode, multiple sequence numbers can be tracked (starting one and its subsequent ones, after removing SKP OS related delays). Similarly, in some embodiments, different types of Flits can be tracked (Payload plus NOP); and in other embodiments, one Flit type can be tracked, such as the Payload Flit.

A Flit or multiple Flits can be transmitted to a receiver by the transmitter-side protocol stack circuitry (904). An Ack/Nak can be received by the protocol stack circuitry to indicate a successful or unsuccessful completion of a transmitted Flit (906). Based on the latency measurement parameters identified from the registers 472, the latency measurement logic 473 can track Flit transmission information (910) and Flit reception and Ack/Nak information (912). The latency measurement logic 473 can determine or calculate latency based on the Flit transmission information and the Flit reception information. The following provides an example:

If multiple Flits are being tracked, begin by tracking the first Flit and track Flits until the Flit just before the SKP OS is transmitted (number=n).

On the receive side, track the Flit whose Ack/Nak sequence number is greater than or equal to (>=) the starting Flit number. (Cycles c from transmit to received Ack/Nak.) Track until receiving a Flit whose Ack/Nak sequence number is greater than or equal to the ending transmitted Flit number being tracked (cycles incremented from c is c'), ignoring any SKP OS received in between c and c'. Thus:
S=start time of the first tracked Flit transmitted;
m=time per Flit;
N=starting sequence number of the tracked Flits;
N'=ending sequence number of the tracked Flits;
n=total Flits tracked (n=N'−N+1).
If R=Received Flit Ack'ing sequence number i:
Launch for i: S+m.i;
Delay for i: (R−S−m.i).

The delay is added to count and increment the received Flit count. The average delay can be thus calculated from these two values (delay and the number of Flits n).

During Replay, stall the Ack or Nak count to account for the retransmission of a Flit or multiple Flits with a specific sequence numbering.

The above mechanism can be extended to measure the latency through Recovery on an error or through Link Retrain or L0p state transitions.

Figure 10:
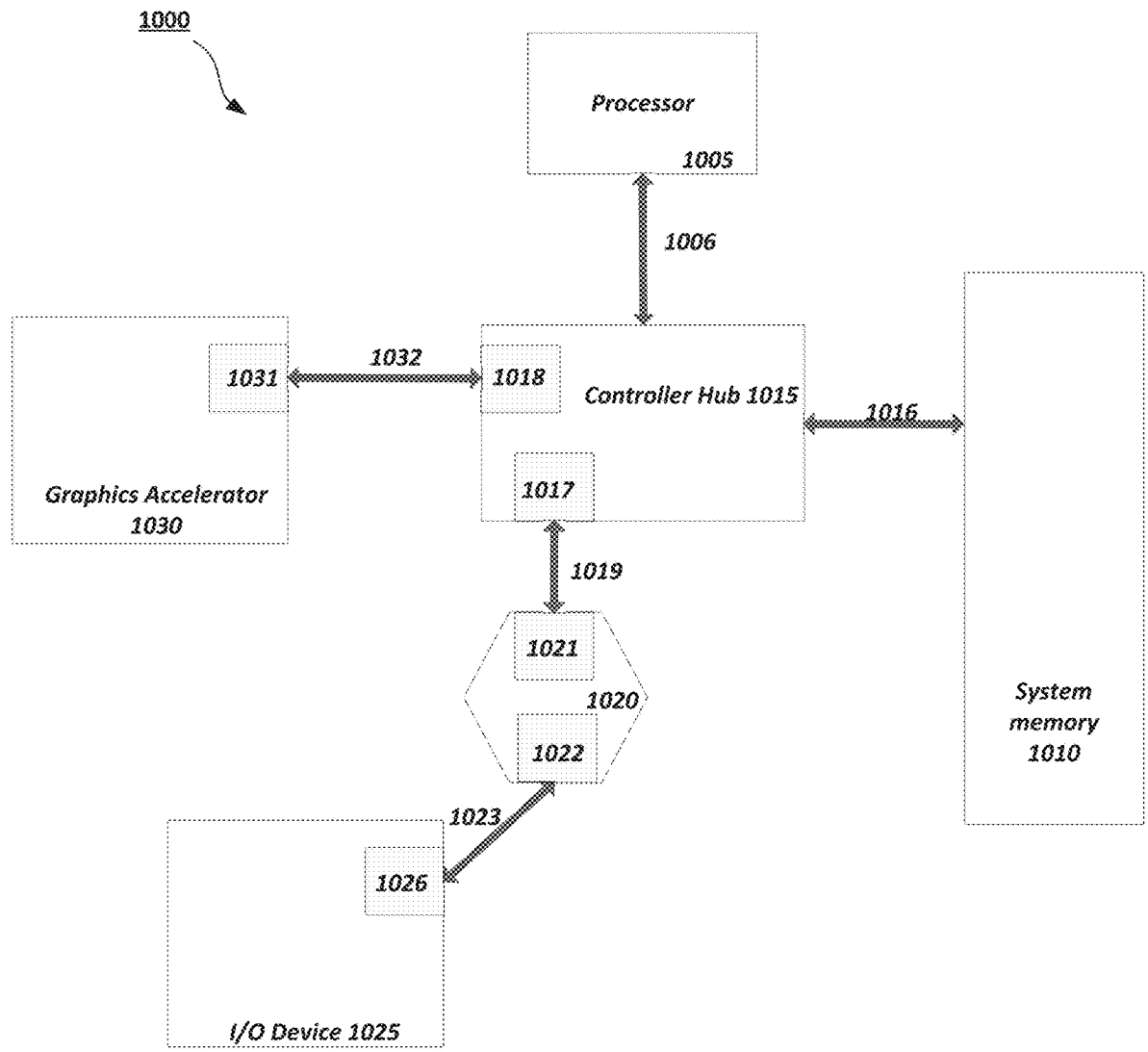
FIG. 10 illustrates an embodiment of a computing system including an interconnect architecture.

Referring to FIG. 10, an embodiment of a fabric composed of point-to-point Links that interconnect a set of components is illustrated. System 1000 includes processor 1005 and system memory 1010 coupled to controller hub 1015. Processor 1005 includes any processing element, such as a microprocessor, a host processor, an embedded processor, a co-processor, or other processor. Processor 1005 is coupled to controller hub 1015 through front-side bus (FSB) 1006. In one embodiment, FSB 1006 is a serial point-to-point interconnect as described below. In another embodiment, link 1006 includes a serial, differential interconnect architecture that is compliant with different interconnect standard.

System memory 1010 includes any memory device, such as random access memory (RAM), non-volatile (NV) memory, or other memory accessible by devices in system 1000. System memory 1010 is coupled to controller hub 1015 through memory interface 1016. Examples of a memory interface include a double-data rate (DDR) memory interface, a dual-channel DDR memory interface, and a dynamic RAM (DRAM) memory interface.

In one embodiment, controller hub 1015 is a root hub, root complex, or root controller in a Peripheral Component Interconnect Express (PCIe or PCIE) interconnection hierarchy. Examples of controller hub 1015 include a chipset, a memory controller hub (MCH), a northbridge, an interconnect controller hub (ICH) a southbridge, and a root port controller/hub. Often the term chipset refers to two physically separate controller hubs, i.e. a memory controller hub (MCH) coupled to an interconnect controller hub (ICH). Note that current systems often include the MCH integrated with processor 1005, while controller 1015 is to communicate with I/O devices, in a similar manner as described below. In some embodiments, peer-to-peer routing is optionally supported through root complex 1015.

Here, controller hub 1015 is coupled to switch/bridge 1020 through serial link 1019. Input/output modules 1017 and 1021, which may also be referred to as interfaces/ports 1017 and 1021, include/implement a layered protocol stack to provide communication between controller hub 1015 and switch 1020. In one embodiment, multiple devices are capable of being coupled to switch 1020.

Switch/bridge 1020 routes packets/messages from device 1025 upstream, i.e. up a hierarchy towards a root complex, to controller hub 1015 and downstream, i.e. down a hierarchy away from a root port controller, from processor 1005 or system memory 1010 to device 1025. Switch 1020, in one embodiment, is referred to as a logical assembly of multiple virtual PCI-to-PCI bridge devices. Device 1025 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 1025 may include a PCIe to PCI/PCI-X bridge to support legacy or other version PCI devices. Endpoint devices in PCIe are often classified as legacy, PCIe, or root complex integrated endpoints.

Graphics accelerator 1030 is also coupled to controller hub 1015 through serial link 1032. In one embodiment, graphics accelerator 1030 is coupled to an MCH, which is coupled to an ICH. Switch 1020, and accordingly I/O device 1025, is then coupled to the ICH. I/O modules 1031 and 1018 are also to implement a layered protocol stack to communicate between graphics accelerator 1030 and controller hub 1015. Similar to the MCH discussion above, a graphics controller or the graphics accelerator 1030 itself may be integrated in processor 1005.

Figure 11:
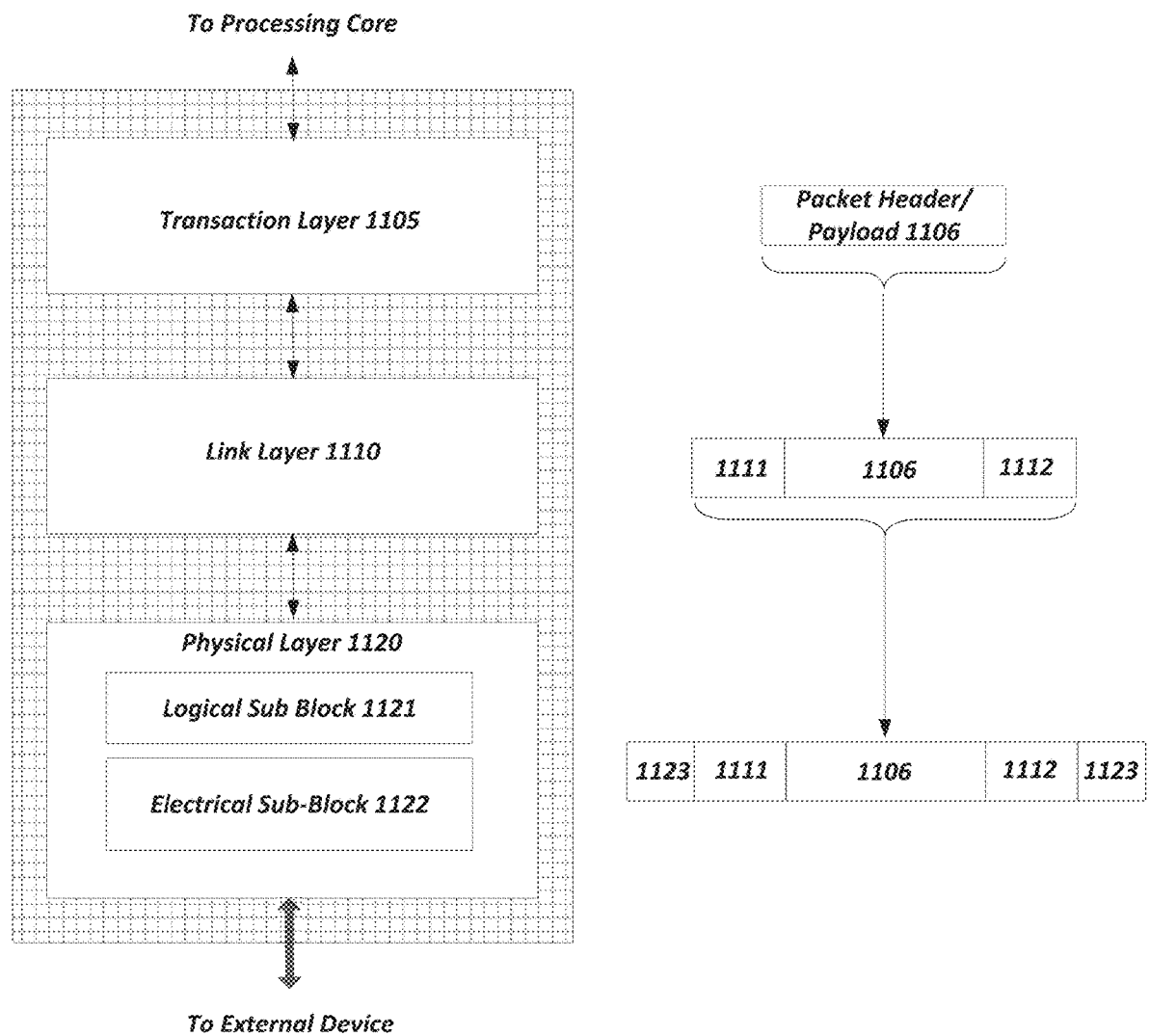
FIG. 11 illustrates an embodiment of an interconnect architecture including a layered stack.

Turning to FIG. 11 an embodiment of a layered protocol stack is illustrated. Layered protocol stack 1100 includes any form of a layered communication stack, such as a Quick Path Interconnect (QPI) stack, a PCIe stack, a next generation high performance computing interconnect stack, or other layered stack. Although the discussion immediately below in reference to FIGS. 10-15 are in relation to a PCIe stack, the same concepts may be applied to other interconnect stacks. In one embodiment, protocol stack 1100 is a PCIe protocol stack including transaction layer 1105, link layer 1110, and physical layer 1120. An interface, such as interfaces 1017, 1018, 1021, 1022, 1026, and 1031 in FIG. 10, may be represented as communication protocol stack 1100. Representation as a communication protocol stack may also be referred to as a module or interface implementing/including a protocol stack.

PCI Express uses packets to communicate information between components. Packets are formed in the Transaction Layer 1105 and Data Link Layer 1110 to carry the information from the transmitting component to the receiving component. As the transmitted packets flow through the other layers, they are extended with additional information necessary to handle packets at those layers. At the receiving side the reverse process occurs and packets get transformed from their Physical Layer 1120 representation to the Data Link Layer 1110 representation and finally (for Transaction Layer Packets) to the form that can be processed by the Transaction Layer 705 of the receiving device.

Transaction Layer

In one embodiment, transaction layer 1105 is to provide an interface between a device's processing core and the interconnect architecture, such as data link layer 1110 and physical layer 1120. In this regard, a primary responsibility of the transaction layer 1105 is the assembly and disassembly of packets (i.e., transaction layer packets, or TLPs). The translation layer 1105 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 1105. An external device at the opposite end of the link, such as controller hub 1015 in FIG. 10, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 1105 assembles packet header/payload 1106. Format for current packet headers/payloads may be found in the PCIe specification at the PCIe specification website.

Figure 12:
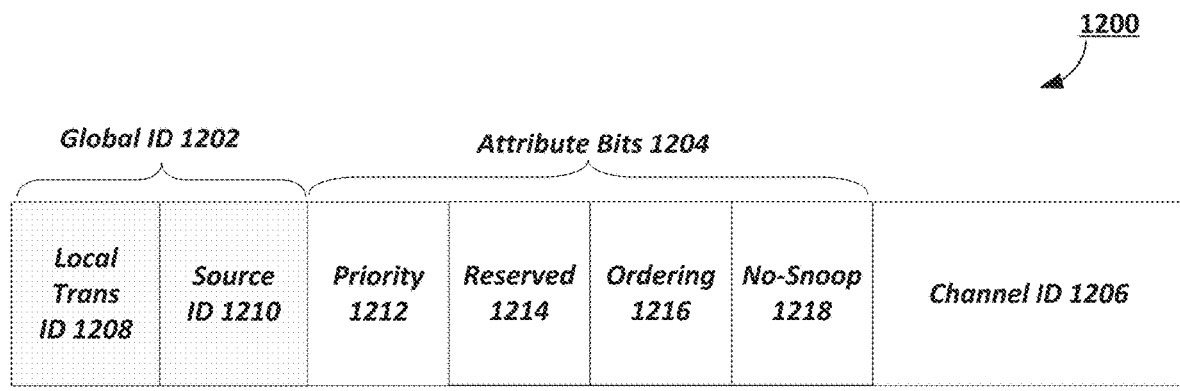
FIG. 12 illustrates an embodiment of a request or packet to be generated or received within an interconnect architecture.

Quickly referring to FIG. 12, an embodiment of a PCIe transaction descriptor is illustrated. In one embodiment, transaction descriptor 1200 is a mechanism for carrying transaction information. In this regard, transaction descriptor 1200 supports identification of transactions in a system. Other potential uses include tracking modifications of default transaction ordering and association of transaction with channels.

Transaction descriptor 1200 includes global identifier field 1202, attributes field 1204, and channel identifier field 1206. In the illustrated example, global identifier field 1202 is depicted comprising local transaction identifier field 1208 and source identifier field 1210. In one embodiment, global transaction identifier 1202 is unique for all outstanding requests.

According to one implementation, local transaction identifier field 1208 is a field generated by a requesting agent, and it is unique for all outstanding requests that require a completion for that requesting agent. Furthermore, in this example, source identifier 1210 uniquely identifies the requestor agent within a PCIe hierarchy. Accordingly, together with source ID 1210, local transaction identifier 1208 field provides global identification of a transaction within a hierarchy domain.

Attributes field 1204 specifies characteristics and relationships of the transaction. In this regard, attributes field 1204 is potentially used to provide additional information that allows modification of the default handling of transactions. In one embodiment, attributes field 1204 includes priority field 1212, reserved field 1214, ordering field 1216, and no-snoop field 1218. Here, priority sub-field 1212 may be modified by an initiator to assign a priority to the transaction. Reserved attribute field 1214 is left reserved for future, or vendor-defined usage. Possible usage models using priority or security attributes may be implemented using the reserved attribute field.

In this example, ordering attribute field 1216 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 1218 is utilized to determine if transactions are snooped. As shown, channel ID Field 1206 identifies a channel that a transaction is associated with.

Link Layer

Link layer 1110, also referred to as data link layer 1110, acts as an intermediate stage between transaction layer 1105 and the physical layer 1120. In one embodiment, a responsibility of the data link layer 1110 is providing a reliable mechanism for exchanging Transaction Layer Packets (TLPs) between two components a link. One side of the Data Link Layer 1110 accepts TLPs assembled by the Transaction Layer 1105, applies packet sequence identifier 1111, i.e. an identification number or packet number, calculates and applies an error detection code, i.e. CRC 1112, and submits the modified TLPs to the Physical Layer 1120 for transmission across a physical to an external device.

Physical Layer

In one embodiment, physical layer 1120 includes logical sub block 1121 and electrical sub-block 1122 to physically transmit a packet to an external device. Here, logical sub-block 1121 is responsible for the "digital" functions of Physical Layer 1121. In this regard, the logical sub-block includes a transmit section to prepare outgoing information for transmission by physical sub-block 1122, and a receiver section to identify and prepare received information before passing it to the Link Layer 1110.

Physical block 1122 includes a transmitter and a receiver. The transmitter is supplied by logical sub-block 1121 with symbols, which the transmitter serializes and transmits onto to an external device. The receiver is supplied with serialized symbols from an external device and transforms the received signals into a bit-stream. The bit-stream is de-serialized and supplied to logical sub-block 1121. In one embodiment, an 8b/10b transmission code is employed, where ten-bit symbols are transmitted/received. Here, special symbols are used to frame a packet with frames 1123. In addition, in one example, the receiver also provides a symbol clock recovered from the incoming serial stream.

As stated above, although transaction layer 1105, link layer 1110, and physical layer 1120 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 13:
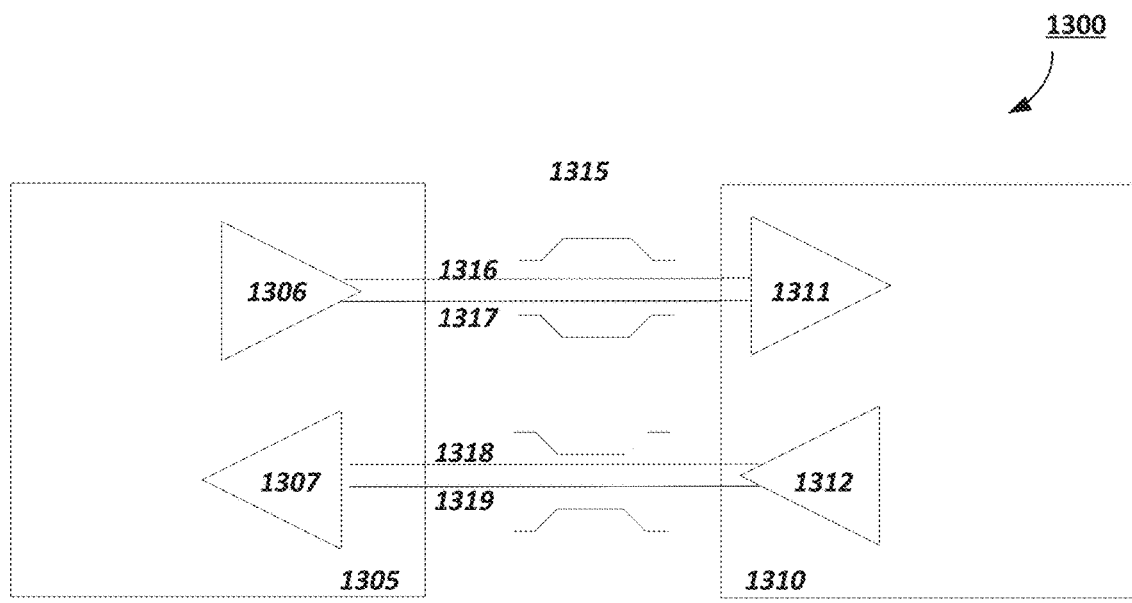
FIG. 13 illustrates an embodiment of a transmitter and receiver pair for an interconnect architecture.

Referring next to FIG. 13, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1306/1311 and a receive pair 1312/1307. Accordingly, device 1305 includes transmission logic 1306 to transmit data to device 1310 and receiving logic 1307 to receive data from device 1310. In other words, two transmitting paths, i.e. paths 1316 and 1317, and two receiving paths, i.e. paths 1318 and 1319, are included in a PCIe link.

A transmission path refers to any path for transmitting data, such as a transmission line, a copper line, an optical line, a wireless communication channel, an infrared communication link, or other communication path. A connection between two devices, such as device 1305 and device 1310, is referred to as a link, such as link 1315. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 1316 and 1317, to transmit differential signals. As an example, when line 1316 toggles from a low voltage level to a high voltage level, i.e. a rising edge, line 1317 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Note that the apparatus, methods, and systems described above may be implemented in any electronic device or system as aforementioned. As specific illustrations, the figures below provide exemplary systems for utilizing the disclosure as described herein. As the systems below are described in more detail, a number of different interconnects are disclosed, described, and revisited from the discussion above. And as is readily apparent, the advances described above may be applied to any of those interconnects, fabrics, or architectures.

Figure 14:
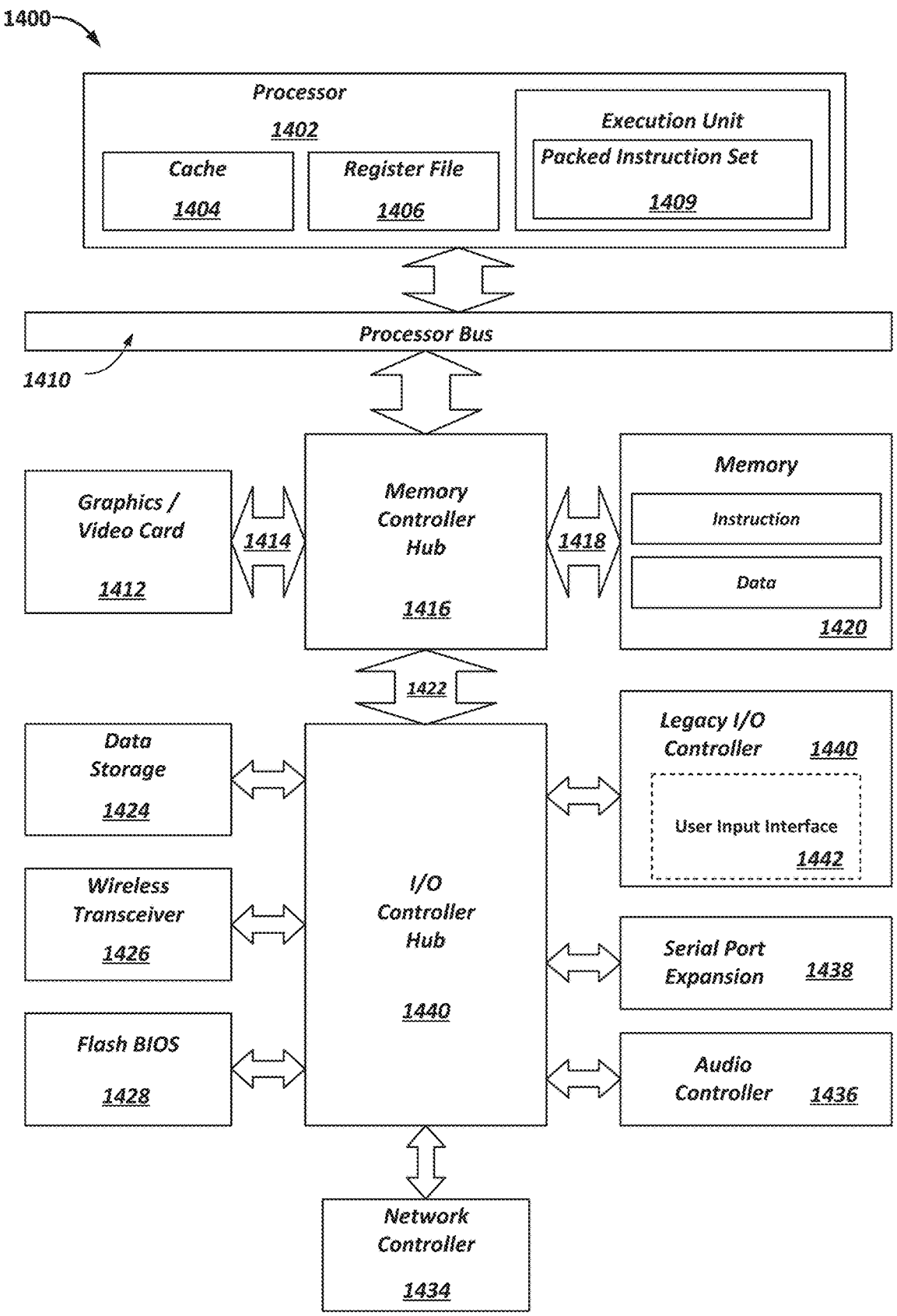
FIG. 14 illustrates another embodiment of a block diagram for a computing system including a processor.

Turning to FIG. 14, a block diagram of an exemplary computer system formed with a processor that includes execution units to execute an instruction, where one or more of the interconnects implement one or more features in accordance with one embodiment of the present disclosure is illustrated. System 1400 includes a component, such as a processor 1402 to employ execution units including logic to perform algorithms for process data, in accordance with the present disclosure, such as in the embodiment described herein. System 1400 is representative of processing systems based on the PENTIUM III™, PENTIUM 4™, Xeon™, Itanium, XScale™ and/or StrongARM™ microprocessors available from Intel Corporation of Santa Clara, California, although other systems (including PCs having other microprocessors, engineering workstations, set-top boxes and the like) may also be used. In one embodiment, sample system 1000 executes a version of the WINDOWS™ operating system available from Microsoft Corporation of Redmond, Washington, although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1402 includes one or more execution units 1008 to implement an algorithm that is to perform at least one instruction. One embodiment may be described in the context of a single processor desktop or server system, but alternative embodiments may be included in a multiprocessor system. System 1400 is an example of a 'hub' system architecture. The computer system 1400 includes a processor 1402 to process data signals. The processor 1402, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1402 is coupled to a processor bus 1410 that transmits data signals between the processor 1402 and other components in the system 1400. The elements of system 1400 (e.g. graphics accelerator 1412, memory controller hub 1416, memory 1420, I/O controller hub 1424, wireless transceiver 1426, Flash BIOS 1028, Network controller 1434, Audio controller 1436, Serial expansion port 1438, I/O controller 1440, etc.) perform their conventional functions that are well known to those familiar with the art.

In one embodiment, the processor 1402 includes a Level 1 (L1) internal cache memory 1404. Depending on the architecture, the processor 1402 may have a single internal cache or multiple levels of internal caches. Other embodiments include a combination of both internal and external caches depending on the particular implementation and needs. Register file 1406 is to store different types of data in various registers including integer registers, floating point registers, vector registers, banked registers, shadow registers, checkpoint registers, status registers, and instruction pointer register.

Execution unit 1408, including logic to perform integer and floating point operations, also resides in the processor 1402. The processor 1402, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1402. For one embodiment, execution unit 1408 includes logic to handle a packed instruction set 1409. By including the packed instruction set 1409 in the instruction set of a general-purpose processor 1402, along with associated circuitry to execute the instructions, the operations used by many multimedia applications may be performed using packed data in a general-purpose processor 1402. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1408 may also be used in micro controllers, embedded processors, graphics devices, DSPs, and other types of logic circuits. System 1400 includes a memory 1420. Memory 1420 includes a dynamic random access memory (DRAM) device, a static random access memory (SRAM) device, flash memory device, or other memory device. Memory 1420 stores instructions and/or data represented by data signals that are to be executed by the processor 1402.

Note that any of the aforementioned features or aspects of the disclosure may be utilized on one or more interconnect illustrated in FIG. 14. For example, an on-die interconnect (ODI), which is not shown, for coupling internal units of processor 1402 implements one or more aspects of the disclosure described above. Or the disclosure is associated with a processor bus 1410 (e.g. Intel Quick Path Interconnect (QPI) or other known high performance computing interconnect), a high bandwidth memory path 1418 to memory 1420, a point-to-point link to graphics accelerator 1412 (e.g. a Peripheral Component Interconnect express (PCIe) compliant fabric), a controller hub interconnect 1422, an I/O or other interconnect (e.g. USB, PCI, PCIe) for coupling the other illustrated components. Some examples of such components include the audio controller 1436, firmware hub (flash BIOS) 1428, wireless transceiver 1426, data storage 1424, legacy I/O controller 1410 containing user input and keyboard interfaces 1442, a serial expansion port 1438 such as Universal Serial Bus (USB), and a network controller 1434. The data storage device 1424 can comprise a hard disk drive, a floppy disk drive, a CD-ROM device, a flash memory device, or other mass storage device.

Figure 15:
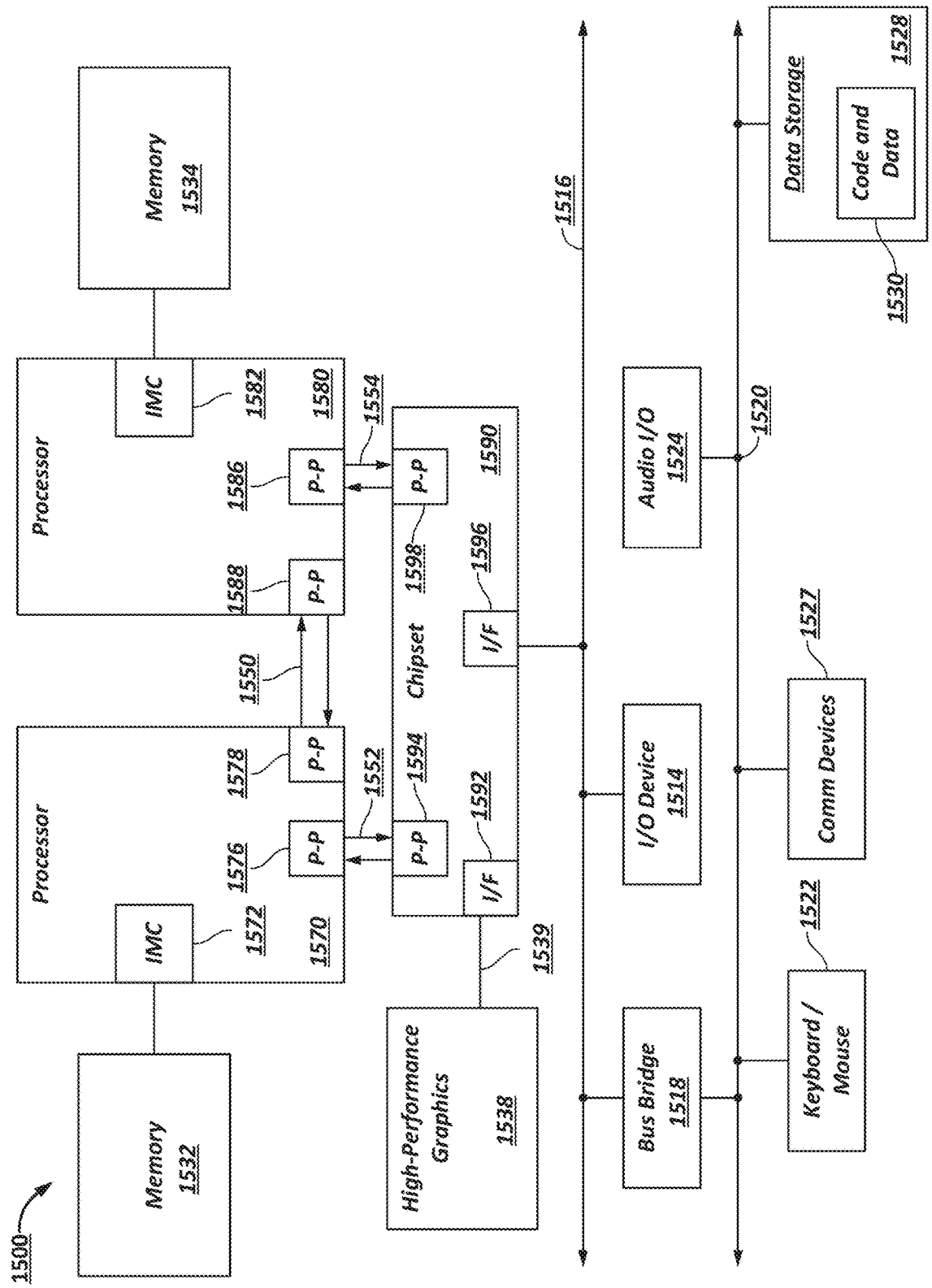
FIG. 15 illustrates an embodiment of a block for a computing system including multiple processor sockets.

Referring now to FIG. 15, shown is a block diagram of a second system 1500 in accordance with an embodiment of the present disclosure. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of a processor. In one embodiment, 1552 and 1554 are part of a serial, point-to-point coherent interconnect fabric, such as Intel's Quick Path Interconnect (QPI) architecture. As a result, the disclosure may be implemented within the QPI architecture.

While shown with only two processors 1570, 1580, it is to be understood that the scope of the present disclosure is not so limited. In other embodiments, one or more additional processors may be present in a given processor.

Processors 1570 and 1580 are shown including integrated memory controller units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 each exchange information with a chipset 1590 via individual P-P interfaces 1552, 1554 using point to point interface circuits 1576, 1594, 1586, 1598. Chipset 1590 also exchanges information with a high-performance graphics circuit 1438 via an interface circuit 1592 along a high-performance graphics interconnect 1539.

A shared cache (not shown) may be included in either processor or outside of both processors; yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present disclosure is not so limited.

As shown in FIG. 15, various I/O devices 1514 are coupled to first bus 1516, along with a bus bridge 1518 which couples first bus 1516 to a second bus 1520. In one embodiment, second bus 1520 includes a low pin count (LPC) bus. Various devices are coupled to second bus 1520 including, for example, a keyboard and/or mouse 1522, communication devices 1527 and a storage unit 1528 such as a disk drive or other mass storage device which often includes instructions/code and data 1530, in one embodiment. Further, an audio I/O 1524 is shown coupled to second bus 1520. Note that other architectures are possible, where the included components and interconnect architectures vary. For example, instead of the point-to-point architecture of FIG. 15, a system may implement a multi-drop bus or other such architecture.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

In one example, a PCIe physical layer may be utilized to support multiple different protocols. Accordingly, a particular training state in a PCIe LTSSM may be utilized for the negotiation of protocols between devices on a link. As noted above, the protocol determination may occur even before the link trains to an active state (e.g., L0) in the lowest supported data rate (e.g., the PCIe Gen 1 data rate). In one example, the PCIe Config state may be used. Indeed, the PCIe LTSSM may be used to negotiate the protocol by using modified PCIe Training Sets (e.g., TS1 and TS2) after the link width negotiation and (at least partially) in parallel with lane numbering performed during the Config state. A protocol stack can include circuitry to support multiple protocols, such as PCIe and CXL.

While this disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase "to" or "configured to," in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Various aspects and combinations of the embodiments are described above, some of which are represented by the following examples:

Example 1 is an apparatus comprising an error injection register comprising error injection parameter information; and error injection logic circuit to read error injection parameter information from the error injection register, and inject an error into a flow control unit (Flit); and protocol stack circuitry to transmit the Flit comprising the error on a multilane link.

Example 2 may include the subject matter of example wherein the error injection parameter information comprises information to activate or deactivate the error injection logic circuit.

Example 3 may include the subject matter of any of examples 1 or 2, wherein the error injection parameter information comprises an indication of a number of errors to be injected into the Flit; and the error injection logic circuit is to inject the number of errors into the Flit based on the indication of the number of errors to be injected in the error injection parameter information.

Example 4 may include the subject matter of any of examples 1-3, wherein:
the error injection parameter information comprises an indication of a spacing, in terms of a number of Flits, between Flits that are to include errors injected; and the error injection logic circuit is to inject an error into a Flit based on the spacing.

Example 5 may include the subject matter of any of examples 1-4, wherein the error injection parameter information comprises an indication of a Flit type that the error is to be injected into; and the error injection logic circuit is to inject an error into a Flit based on the Flit type.

Example 6 may include the subject matter of example 5, wherein the indication of a Flit type in the error injection parameter information comprises an indication that an error is to be injected into any non-Idle Flit, a Payload Flit, a No Operation (NOP) Flit, or any type of Flit.

Example 7 may include the subject matter of any of examples 1-5, wherein the error injection parameter information comprises an indication of a type of error to be injected into the Flit; and the error injection logic circuit is to inject the type of errors into the Flit based on the indication of the type of errors to be injected in the error injection parameter information.

Example 8 may include the subject matter of example 7, wherein the indication of the type of error can indicate that the error can be a correctable error or an uncorrectable error.

Example 9 may include the subject matter of any of examples 1-8, wherein the indication of the type of error can indicate that the error is to be a correctable error in one forward error correction group or a correctable error in three forward error correction groups.

Example 10 may include the subject matter of any of examples 1-9, wherein the indication of the type of error can indicate the error is to be randomly selected between a correctable error or an uncorrectable error.

Example 11 may include the subject matter of any of examples 1-10, wherein the error injection parameter information comprises an indication of a magnitude of an error to be injected into the Flit; and the error injection logic circuit is to inject the error with the magnitude into the Flit based on the indication of the magnitude of errors to be injected in the error injection parameter information.

Example 12 may include the subject matter of any of examples 1-11, further comprising a port to receive a Flit; wherein the error injection parameter information comprises an indication to inject a negative acknowledgment (NAK) into a received Flit; and the error injection logic circuit is to inject a NAK into a received Flit.

Example 13 may include the subject matter of any of examples 1-12, further comprising a port to receive a Flit; wherein the error injection parameter information comprises an indication to for a replay of the received Flit; and the protocol stack circuitry to cause the Flit to be retransmitted.

Example 14 may include the subject matter of any of examples 1-13, further comprising an ordered set error register comprising ordered set error injection parameter information; an ordered set error injection circuit to determine that ordered set error injection is activated, read the ordered set error injection parameter information, and inject an error into an ordered set; and the protocol stack circuitry to transmit the ordered set with the error on a multilane link.

Example is 15 is a method comprising encoding, by protocol stack circuitry, a flow control unit (Flit); encoding, by error injection circuitry, an error into the Flit based on an error injection parameter stored in an error injection register; transmitting the Flit on a multilane link with the error.

Example 16 may include the subject matter of example 15, further comprising calculating error correcting code for the Flit prior to encoding the error into the Flit; and encoding the Flit with error correcting code prior to encoding the error into the Flit.

Example 17 may include the subject matter of any of examples 15 or 16, further comprising calculating cyclic redundancy check code for the Flit prior to encoding the error into the Flit; and encoding the Flit with cyclic redundancy check code for the Flit prior to encoding the error into the Flit.

Example 18 may include the subject matter of any of examples 15-17, further comprising determining an error injection parameter from an error injection parameter register; encoding the error into the Flit based on the error injection parameter.

Example 19 may include the subject matter of example 18, wherein the error injection parameter comprises one or more of an error magnitude, a number of errors, a Flit spacing between error occurrences, a Flit type, a type of error being encoded, or an error offset.

Example 20 may include the subject matter of any of examples 15-19, further comprising receiving a negative acknowledgment message for a previously transmitted Flit; and replaying the previously transmitted Flit.

Example 21 is a system comprising a host device comprising a transmitter to transmit a flow control unit (Flit) over a multilane link, the host device comprising: error injection register comprising error injection parameter information; and error injection logic circuit to: read error injection parameter information from the error injection register, and inject an error into a Flit; and protocol stack circuitry to transmit the Flit comprising the error on a multilane link; an endpoint device comprising a receiver port to receive the Flit, the receiver port comprising: error detection circuitry to detect the error in a Flit, and an error log to store information pertaining to the error in the Flit.

Example 22 may include the subject matter of example 21, further comprising protocol stack circuitry to calculate error correcting code for the Flit prior to encoding the error into the Flit; and encode the Flit with error correcting code prior to encoding the error into the Flit.

Example 23 may include the subject matter of any of examples 21 or 22, further comprising protocol stack circuitry to calculate cyclic redundancy check code for the Flit prior to encoding the error into the Flit; and encode the Flit with cyclic redundancy check code for the Flit prior to encoding the error into the Flit.

Example 24 may include the subject matter of any of examples 21-23, the error injection circuitry to determine an error injection parameter from an error injection parameter register; and encode the error into the Flit based on the error injection parameter.

Example 25 may include the subject matter of example 24, wherein the error injection parameter comprises one or more of an error magnitude, a number of errors, a Flit spacing between error occurrences, a Flit type, a type of error being encoded, or an error offset.

What is claimed is:

1. An apparatus comprising:
   an error injection configuration register comprising error injection parameter information, the error injection parameter information comprising an indication of a spacing, in terms of a number of flow control units (Flits), between occurrences of injected errors; and
   an error injection logic circuit to:
      read the error injection parameter information from the error injection configuration register, and
      inject an error into a flow control unit (Flit) based on the error injection parameter information; and
   protocol stack circuitry to transmit the Flit comprising the error on a multilane link.

2. The apparatus of claim 1, wherein the error injection parameter information comprises information to activate or deactivate the error injection logic circuit.

3. The apparatus of claim 1, wherein:
   the error injection parameter information comprises an indication of a number of errors to be injected into the Flit; and
   the error injection logic circuit is to inject the number of errors into the Flit based on the indication of the number of errors to be injected in the error injection parameter information.

4. The apparatus of claim 1, wherein:
   the error injection parameter information comprises an indication of a Flit type that the error is to be injected into; and
   the error injection logic circuit is to inject an error into a Flit based on the Flit type.

5. The apparatus of claim 4, wherein the indication of a Flit type in the error injection parameter information comprises an indication that an error is to be injected into any non-Idle Flit, a Payload Flit, a No Operation (NOP) Flit, or any type of Flit.

6. The apparatus of claim 1, wherein:
   the error injection parameter information comprises an indication of a type of error to be injected into the Flit; and
   the error injection logic circuit is to inject the type of errors into the Flit based on the indication of the type of errors to be injected in the error injection parameter information.

7. The apparatus of claim 6, wherein the indication of the type of error can indicate that the error can be a correctable error or an uncorrectable error.

8. The apparatus of claim 7, wherein the indication of the type of error can indicate that the error is to be a correctable error in one forward error correction group or a correctable error in three forward error correction groups.

9. The apparatus of claim 7, wherein the indication of the type of error can indicate the error is to be randomly selected between a correctable error or an uncorrectable error.

10. The apparatus of claim 1, wherein:
    the error injection parameter information comprises an indication of a magnitude of an error to be injected into the Flit; and
    the error injection logic circuit is to inject the error with the magnitude into the Flit based on the indication of the magnitude of errors to be injected in the error injection parameter information.

11. The apparatus of claim 1, further comprising a port to receive a Flit;
wherein:
the error injection parameter information comprises an indication to inject a negative acknowledgment (NAK) into a received Flit; and
the error injection logic circuit is to inject a NAK into a received Flit.

12. The apparatus of claim 1, further comprising a port to receive a Flit;
wherein:
the error injection parameter information comprises an indication to force a replay of the received Flit; and
the protocol stack circuitry to cause the Flit to be retransmitted.

13. The apparatus of claim 1, further comprising:
an ordered set error register comprising ordered set error injection parameter information;
an ordered set error injection circuit to:
determine that ordered set error injection is activated,
read the ordered set error injection parameter information, and
inject an error into an ordered set; and
the protocol stack circuitry to transmit the ordered set with the error on a multilane link.

14. A method comprising:
encoding, by protocol stack circuitry, a flow control unit (Flit);
encoding, by error injection circuitry, an error into the Flit based on an error injection parameter stored in an error injection register, the error injection parameter indicating a spacing, in terms of a number of Flits, between occurrences of injected errors;
transmitting the Flit on a multilane link with the error.

15. The method of claim 14, further comprising:
calculating error correcting code for the Flit prior to encoding the error into the Flit; and
encoding the Flit with error correcting code prior to encoding the error into the Flit.

16. The method of claim 14, further comprising:
calculating cyclic redundancy check code for the Flit prior to encoding the error into the Flit; and
encoding the Flit with cyclic redundancy check code for the Flit prior to encoding the error into the Flit.

17. The method of claim 14, further comprising:
determining an additional error injection parameter from the error injection register;
encoding the error into the Flit based on the additional error injection parameter.

18. The method of claim 14, wherein the error injection parameter comprises one or more of an error magnitude, a number of errors, a Flit type, a type of error being encoded, or an error offset.

19. The method of claim 14, further comprising:
receiving a negative acknowledgment message for a previously transmitted Flit; and
replaying the previously transmitted Flit.

20. A system comprising:
a host device comprising a transmitter to transmit a flow control unit (Flit) over a multilane link, the host device comprising:
error injection register comprising error injection parameter information, the error injection parameter information comprising an indication of a spacing, in terms of a number of flow control units (Flits), between occurrences of injected errors; and
error injection logic circuit to:
read error injection parameter information from the error injection register, and
inject an error into a Flit based on the error injection parameter information; and
protocol stack circuitry to transmit the Flit comprising the error on a multilane link;
an endpoint device comprising a receiver port to receive the Flit, the receiver port comprising:
error detection circuitry to detect the error in a Flit, and
an error log to store information pertaining to the error in the Flit.

21. The system of claim 20, further comprising protocol stack circuitry to:
calculate error correcting code for the Flit prior to encoding the error into the Flit; and
encode the Flit with error correcting code prior to encoding the error into the Flit.

22. The system of claim 20, further comprising protocol stack circuitry to:
calculate cyclic redundancy check code for the Flit prior to encoding the error into the Flit; and
encode the Flit with cyclic redundancy check code for the Flit prior to encoding the error into the Flit.

23. The system of claim 20, the error injection circuitry to:
determine an error injection parameter from an error injection parameter register;
encode the error into the Flit based on the error injection parameter.

24. The system of claim 23, wherein the error injection parameter comprises one or more of an error magnitude, a number of errors, a Flit type, a type of error being encoded, or an error offset.

* * * * *